(12) United States Patent
Chen et al.

(10) Patent No.: US 10,269,135 B2
(45) Date of Patent: Apr. 23, 2019

(54) METHODS AND SYSTEMS FOR PERFORMING SLEEPING OBJECT DETECTION IN VIDEO ANALYTICS

(71) Applicant: QUALCOMM Incorporated, San Diego, CA (US)

(72) Inventors: Ying Chen, San Diego, CA (US); Zhongmin Wang, San Diego, CA (US); Lei Wang, Clovis, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/645,555

(22) Filed: Jul. 10, 2017

(65) Prior Publication Data

US 2018/0268563 A1   Sep. 20, 2018

Related U.S. Application Data

(60) Provisional application No. 62/471,123, filed on Mar. 14, 2017, provisional application No. 62/471,755, filed on Mar. 15, 2017.

(51) Int. Cl.
*G06K 9/00* (2006.01)
*H04N 5/225* (2006.01)
(Continued)

(52) U.S. Cl.
CPC ............... *G06T 7/70* (2017.01); *G06K 9/6202* (2013.01); *G06T 7/90* (2017.01);
(Continued)

(58) Field of Classification Search
USPC ....... 382/100, 103, 106–107, 154, 155, 162, 382/168, 173, 181, 190, 199, 209, 220,
(Continued)

(56) References Cited

U.S. PATENT DOCUMENTS

2006/0170769 A1\* 8/2006 Zhou ................. G06K 9/00362
348/143
2007/0127774 A1\* 6/2007 Zhang ................ G06K 9/00771
382/103
(Continued)

OTHER PUBLICATIONS

Jadhav L.H., et al., "Detection and Identification of Unattended/Removed Objects in Video Surveillance", IEEE International Conference on Recent Trends in Electronics Information Communication Technology, May 20-21, 2016, pp. 1770-1773.

*Primary Examiner* — Seyed H Azarian
(74) *Attorney, Agent, or Firm* — Polsinelli

(57) ABSTRACT

Methods, apparatuses, and computer-readable media are provided for maintaining blob trackers for video frames. For example, a blob tracker maintained for a current video frame is identified. The blob tracker is associated with a blob detected in one or more video frames. The blob includes pixels of at least a portion of a foreground object in the one or more video frames. A current bounding region of the blob tracker for the current video frame is compared to a previous bounding region of the blob tracker for a previous video frame that is obtained earlier in time than the current video frame. It can be determined whether the current bounding region has decreased in size as compared to a size of the previous bounding region, and whether a first color characteristic of pixels of the current video frame included in the previous bounding region is within a threshold from a second color characteristic of pixels of the previous video frame included in the previous bounding region. In some examples, the blob is tracked in the current frame using the current bounding region when the current bounding region has decreased in size and when the first color characteristic is within the threshold from the second color characteristic. In some examples, the blob is tracked using the current bounding region when the blob tracker is determined to be lost (e.g., the blob tracker is not associated with the blob in the current video frame).

30 Claims, 18 Drawing Sheets

(51) Int. Cl.
*G06T 7/70* (2017.01)
*G06K 9/62* (2006.01)
*G06T 7/90* (2017.01)

(52) U.S. Cl.
CPC ............... *G06T 2207/10016* (2013.01); *G06T 2207/30196* (2013.01); *G06T 2207/30232* (2013.01); *G06T 2210/12* (2013.01)

(58) Field of Classification Search
USPC ....... 382/232, 254, 274, 276, 286–291, 305, 382/312, 164; 348/169, 143
See application file for complete search history.

(56) References Cited

U.S. PATENT DOCUMENTS

| | | | |
|---|---|---|---|
| 2008/0231709 A1* | 9/2008 | Brown | G06K 9/00771 348/169 |
| 2009/0309966 A1 | 12/2009 | Chen et al. | |
| 2013/0051613 A1* | 2/2013 | Bobbitt | G06K 9/00771 382/103 |
| 2014/0003713 A1* | 1/2014 | Seow | G06T 5/009 382/164 |
| 2015/0189191 A1 | 7/2015 | Cucco | |
| 2016/0063344 A1 | 3/2016 | Fan et al. | |

\* cited by examiner

FIG. 5

METHODS AND SYSTEMS FOR PERFORMING SLEEPING OBJECT DETECTION IN VIDEO ANALYTICS

CROSS-REFERENCE TO RELATED APPLICATIONS

This application claims the benefit of U.S. Provisional Application No. 62/471,123, filed Mar. 14, 2017. This application also claims the benefit of U.S. Provisional Application No. 62/471,755, filed Mar. 15, 2017. Both of these provisional applications are hereby incorporated by reference, in their entirety and for all purposes.

FIELD

The present disclosure generally relates to video analytics, and more specifically to techniques and systems for detecting sleeping or stationary objects in video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing sleeping object detection in video analytics. Video analytics can be based on background subtraction to detect and track motion objects. Such a video analytics system can contain a blob (or object) detection component and a blob (or object) tracking component. The blob detection component can use data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. The detected blobs can be provided, for example, for blob processing, object tracking by the blob (or object) tracking component, and other video analytics functions. For example, temporal information of the blobs can be used to identify stable objects or blobs so that a tracking layer can be established.

Background subtraction encounters issues when dealing with sleeping objects. A sleeping object is an object moving through a scene that becomes stationary or static. A blob (and the object represented by the blob) can be detected and further tracked based on background subtraction as long as the object is in motion. However, in some cases, it is possible for a moving object in a scene to stop moving. For such a sleeping object, the background subtraction model will transition the pixels of the object from foreground pixels to background pixels due to the nature of background subtraction adapting to local changes quickly, causing the object and its blob to fade into the background and no longer be detected and tracked. The techniques and systems described herein can detect sleeping objects so that the sleeping objects can continue to be tracked using video analytics.

According to at least one example, a method of maintaining blob trackers for video frames is provided. The method includes identifying a blob tracker maintained for a current video frame. The blob tracker is associated with a blob detected in one or more video frames. The blob includes pixels of at least a portion of a foreground object in the one or more video frames. The method further includes comparing a current bounding region of the blob tracker for the current video frame to a previous bounding region of the blob tracker for a previous video frame. The previous video frame is obtained earlier in time than the current video frame. The method further includes determining the current bounding region has decreased in size as compared to a size of the previous bounding region, and determining a first color characteristic of pixels of the current video frame included in the previous bounding region is within a threshold (e.g., a threshold difference) from a second color characteristic of pixels of the previous video frame included in the previous bounding region. The method further includes tracking the blob in the current frame using the current bounding region when the current bounding region has decreased in size and when the first color characteristic is within the threshold from the second color characteristic.

In another example, an apparatus is provided for maintaining blob trackers for video frames. The apparatus includes a processor and a memory configured to store video data associated with the video frames. The processor is configured to and can identify a blob tracker maintained for a current video frame. The blob tracker is associated with a blob detected in one or more video frames. The blob includes pixels of at least a portion of a foreground object in the one or more video frames. The processor is further configured to and can compare a current bounding region of the blob tracker for the current video frame to a previous bounding region of the blob tracker for a previous video frame. The previous video frame is obtained earlier in time than the current video frame. The processor is further configured to and can determine the current bounding region has decreased in size as compared to a size of the previous bounding region, and determine a first color characteristic of pixels of the current video frame included in the previous bounding region is within a threshold (e.g., a threshold difference) from a second color characteristic of pixels of the previous video frame included in the previous bounding region. The processor is further configured to and can track the blob in the current frame using the current bounding region when the current bounding region has decreased in size and when the first color characteristic is within the threshold from the second color characteristic.

In another example, a non-transitory computer-readable medium is provided having stored thereon instructions that, when executed by one or more processors, cause the one or more processor to: identify a blob tracker maintained for a current video frame, wherein the blob tracker is associated with a blob detected in one or more video frames, the blob including pixels of at least a portion of a foreground object in the one or more video frames; compare a current bounding region of the blob tracker for the current video frame to a previous bounding region of the blob tracker for a previous video frame, the previous video frame being obtained earlier in time than the current video frame; determine the current bounding region has decreased in size as compared to a size of the previous bounding region; determine a first color characteristic of pixels of the current video frame included in the previous bounding region is within a threshold (e.g., a threshold difference) from a second color characteristic of pixels of the previous video frame included in the previous bounding region; and track the blob in the current frame using the current bounding region when the current bounding region has decreased in size and when the first color characteristic is within the threshold from the second color characteristic.

In another example, an apparatus is provided for maintaining blob trackers for video frames that includes means for identifying a blob tracker maintained for a current video frame. The blob tracker is associated with a blob detected in one or more video frames. The blob includes pixels of at least a portion of a foreground object in the one or more video frames. The apparatus further includes means for comparing a current bounding region of the blob tracker for the current video frame to a previous bounding region of the blob tracker for a previous video frame. The previous video frame is obtained earlier in time than the current video frame. The apparatus further includes means for determining the current bounding region has decreased in size as compared to a size of the previous bounding region, and means for determining a first color characteristic of pixels of the current video frame included in the previous bounding region is within a threshold (e.g., a threshold difference) from a second color characteristic of pixels of the previous video frame included in the previous bounding region. The apparatus further includes means for tracking the blob in the current frame using the current bounding region when the current bounding region has decreased in size and when the first color characteristic is within the threshold from the second color characteristic.

In some aspects, the methods, apparatuses, and computer readable medium described above further comprise: transitioning a status of the blob tracker to a sleeping status when the current bounding region has decreased in size and when the first color characteristic is within the threshold from the second color characteristic; and wherein the blob is tracked in the current frame using the current bounding region when the blob tracker has the sleeping status in the current frame.

In some aspects, the methods, apparatuses, and computer readable medium described above further comprise: determining the blob tracker is not associated with the blob in the current video frame; determining the blob tracker is lost in the current video frame based on the blob tracker not being associated with the blob in the current video frame; and determining the current bounding region has decreased in size as compared to the size of the previous bounding region and determining the first color characteristic is within the threshold from the second color characteristic when the blob tracker is determined to be lost in the current video frame.

In some aspects, the methods, apparatuses, and computer readable medium described above further comprise: transitioning a status of the blob tracker to a sleeping status when the blob tracker is determined to be lost in the current video frame, when the current bounding region has decreased in size, and when the first color characteristic is within the threshold from the second color characteristic; and wherein the blob is tracked in the current frame using the current bounding region when the blob tracker has the sleeping status in the current frame.

In some aspects, determining the current bounding region has decreased in size as compared to the size of the previous bounding region includes: determining the current bounding region is within the previous bounding region; and determining, when the current bounding region is within the previous bounding region, the current bounding region has decreased in size by a threshold amount as compared to the size of the previous bounding region.

In some aspects, determining whether the current bounding region is within the previous bounding region includes determining a size of the current bounding region is smaller than the size of the previous bounding region and that boundaries of the current bounding region are entirely within boundaries of the previous bounding region.

In some aspects, the methods, apparatuses, and computer readable medium described above further comprise determining bounding regions for the blob tracker have decreased in size as compared to the size of the previous bounding region for a threshold number of frames. In such aspects, the blob is tracked in the current frame using the current bounding region when bounding regions for the blob tracker have decreased in size as compared to the size of the previous bounding region for the threshold number of frames.

In some aspects, the first color characteristic includes at least one or more of a color feature space or a color mass center of the pixels of the current video frame included in the previous bounding region, and wherein the second color characteristic includes at least one or more of a color feature space or a color mass center of the pixels of the previous video frame included in the previous bounding region.

In some aspects, determining the first color characteristic is within the threshold from the second color characteristic includes: calculating a first appearance model for the blob tracker, the first appearance model including at least one or more of a color feature space or a color mass center of the pixels of the current video frame included in the previous bounding region; calculating a second appearance model for the blob tracker, the second appearance model including at least one or more of a color feature space or a color mass center of the pixels of the previous video frame included in the previous bounding region; comparing the first appearance model to the second appearance model; and determining a difference between the first appearance model and the second appearance model is within the threshold.

In some aspects, the first color characteristic is compared to the second color characteristic to determine the first color characteristic is within the threshold from the second color characteristic when it is determined that the current bounding region has decreased in size as compared to the size of the previous bounding region.

In some aspects, the methods, apparatuses, and computer readable medium described above further comprise updating a target bounding region of the blob tracker from the previous bounding region to a subsequent bounding region of a subsequent video frame. The subsequent video frame is obtained later in time than the current frame.

In some aspects, the methods, apparatuses, and computer readable medium described above further comprise updating an appearance model of the blob tracker using information of the subsequent video frame.

In some aspects, the methods, apparatuses, and computer readable medium described above further comprise determining a size of the subsequent bounding region of the blob tracker for the subsequent video frame has not decreased in size as compared to the size of the previous bounding region. In such aspects, at least one or more of the target bounding region or the appearance model are updated when the size of the subsequent bounding region of the blob tracker is determined not to have decreased in size as compared to the size of the previous bounding region.

In some aspects, the methods, apparatuses, and computer readable medium described above further comprise determining a color characteristic of pixels included in the subsequent bounding region is not within the threshold from the second color characteristic of the pixels included in the previous bounding region. In such aspects, at least one or more of the target bounding region or the appearance model are updated when the color characteristic of the pixels included in the subsequent bounding region is determined not to be within the threshold from the second color characteristic.

In some aspects, the methods, apparatuses, and computer readable medium described above further comprise determining whether the blob is within a threshold distance to a boundary of the current video frame. In such aspects, the blob is tracked in the current frame using the current bounding region when the blob is not within the threshold distance to the boundary.

In some aspects, the methods, apparatuses, and computer readable medium described above further comprise determining whether the blob is at least partially outside of a boundary of the current video frame. In such aspects, the blob is tracked in the current frame using the current bounding region when the blob is not at least partially outside of the boundary.

In some aspects, the methods, apparatuses, and computer readable medium described above further comprise periodically selecting one or more bounding regions of the blob tracker as one or more target bounding regions according to a first period. In some aspects, the methods, apparatuses, and computer readable medium described above further comprise periodically comparing subsequent bounding regions of the blob tracker to the one or more selected target bounding regions according to a second period. In some aspects, the first period is equal to the second period. In some aspects, the first period is less than the second period. In some aspects, the methods, apparatuses, and computer readable medium described above further comprise updating an appearance model of the blob tracker according to the second period.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5 is an illustration of video frames of an environment in which objects are detected, in accordance with some examples.

DETAILED DESCRIPTION

Figure 1:
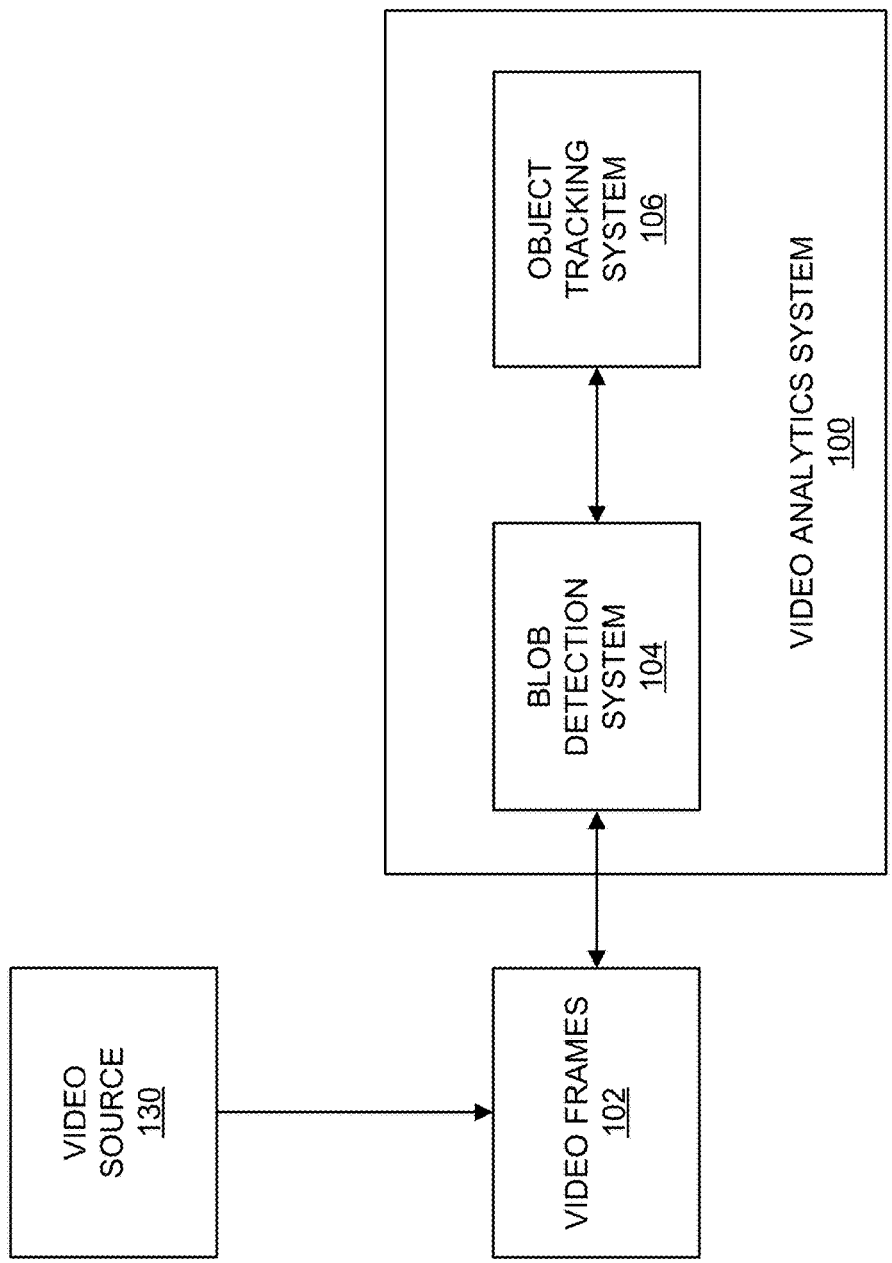
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and may send an alert or alarm to a central control room to alert a user of the event of interest.

As described in more detail herein, a blob detection component of a video analytics system can generate and/or detect foreground blobs that represent at least a portion of a foreground object in a scene. The detected blobs can be used to perform various operations, such as object tracking (also called blob tracking) or other operations described herein. Blob detection can be performed using background subtraction techniques, which may encounter issues when dealing with sleeping objects. A sleeping object is an object moving through a scene that becomes stationary or static. For instance, a blob (and the object represented by the blob) can be detected and further tracked based on background subtraction as long as the object is in motion. At some point, a moving object in a scene can stop moving, and can eventually become a sleeping object. The background subtraction model will transition the pixels of the sleeping object from foreground pixels to background pixels, causing the object and its blob to fade into the background and no longer be detected and tracked. As described in more detail below, systems and methods for detecting sleeping objects are described herein so that the sleeping objects can continue to be detected and tracked using video analytics.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking.

The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding region can be associated with a blob. In some examples, a tracker can also be represented by a tracker bounding region. A bounding region of a blob or tracker can include a bounding box, a bounding circle, a bounding ellipse, or any other suitably-shaped region representing a tracker or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blob detection can be performed to segment moving foreground objects from the global static background in a video sequence. In some cases, there are two major steps in blob detection, including background subtraction and blob analysis. For example, blob detection can contain a background subtraction engine that detects foreground pixels and one or more foreground pixel processing engines that process and group the foreground pixels into foreground blobs for tracking purposes. In some cases, background subtraction can be performed to provide a foreground/background mask (referred to herein as a foreground mask) of a current input frame (the current frame being processed), while the blob analysis takes the foreground mask and produces foreground blobs. The foreground blobs can be represented as bounding boxes (e.g., having a rectangular, square, or other suitable shape) or other bounding region. In some examples, the blob detection system 104 and object tracking system 106 take as input a current frame, and output the metadata of each current frame. The metadata contains a list of bounding boxes (e.g., bounding boxes of the blob trackers, bounding boxes of the detected foreground blobs, or the bounding boxes of the blob trackers and the detected foreground blobs), each with a bounding box identifier (ID). In some cases, the metadata is on a per frame basis, recording the results of the blob detection and tracking systems. Such metadata can be further interrupted, depending on the particular system configuration.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
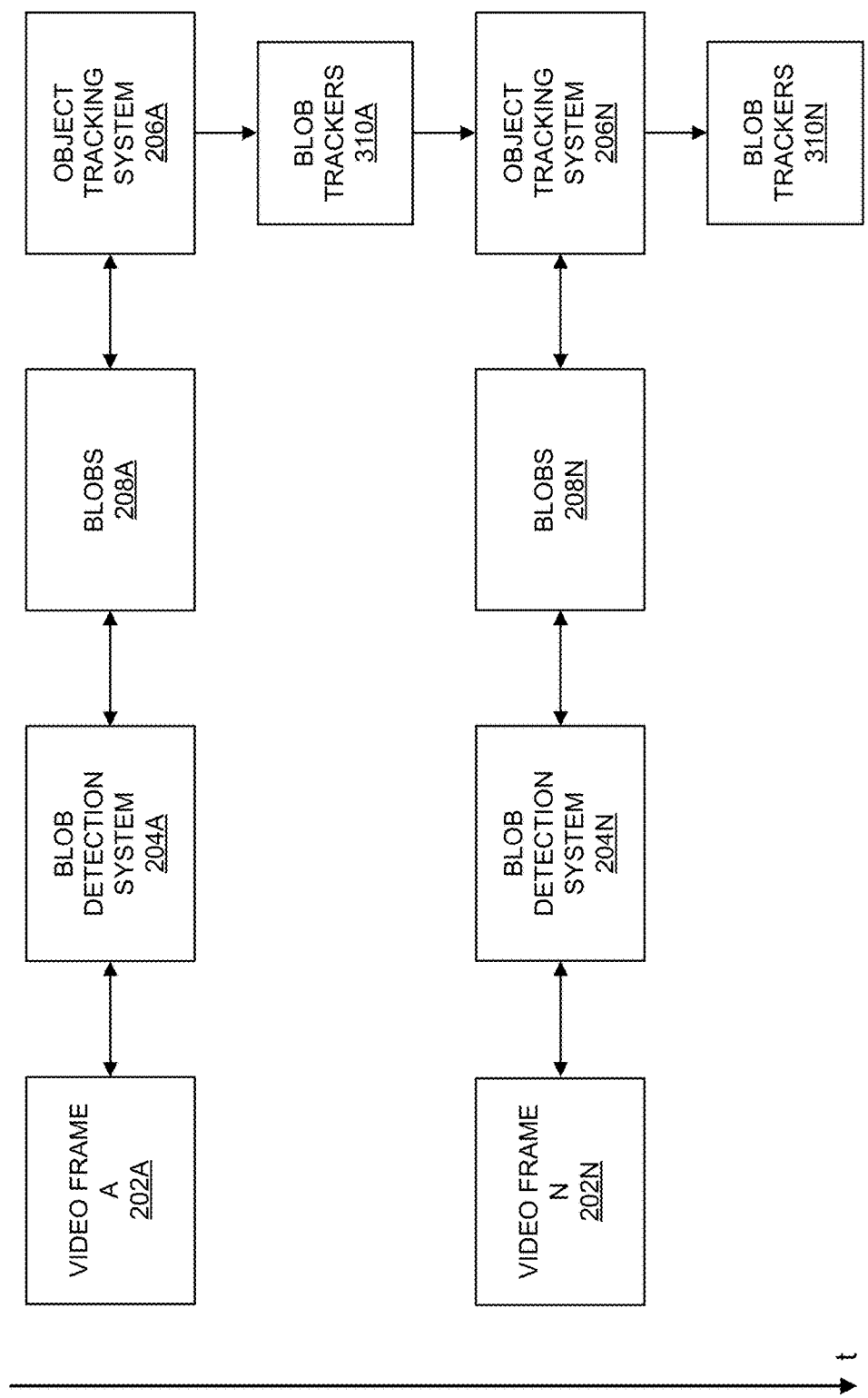
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
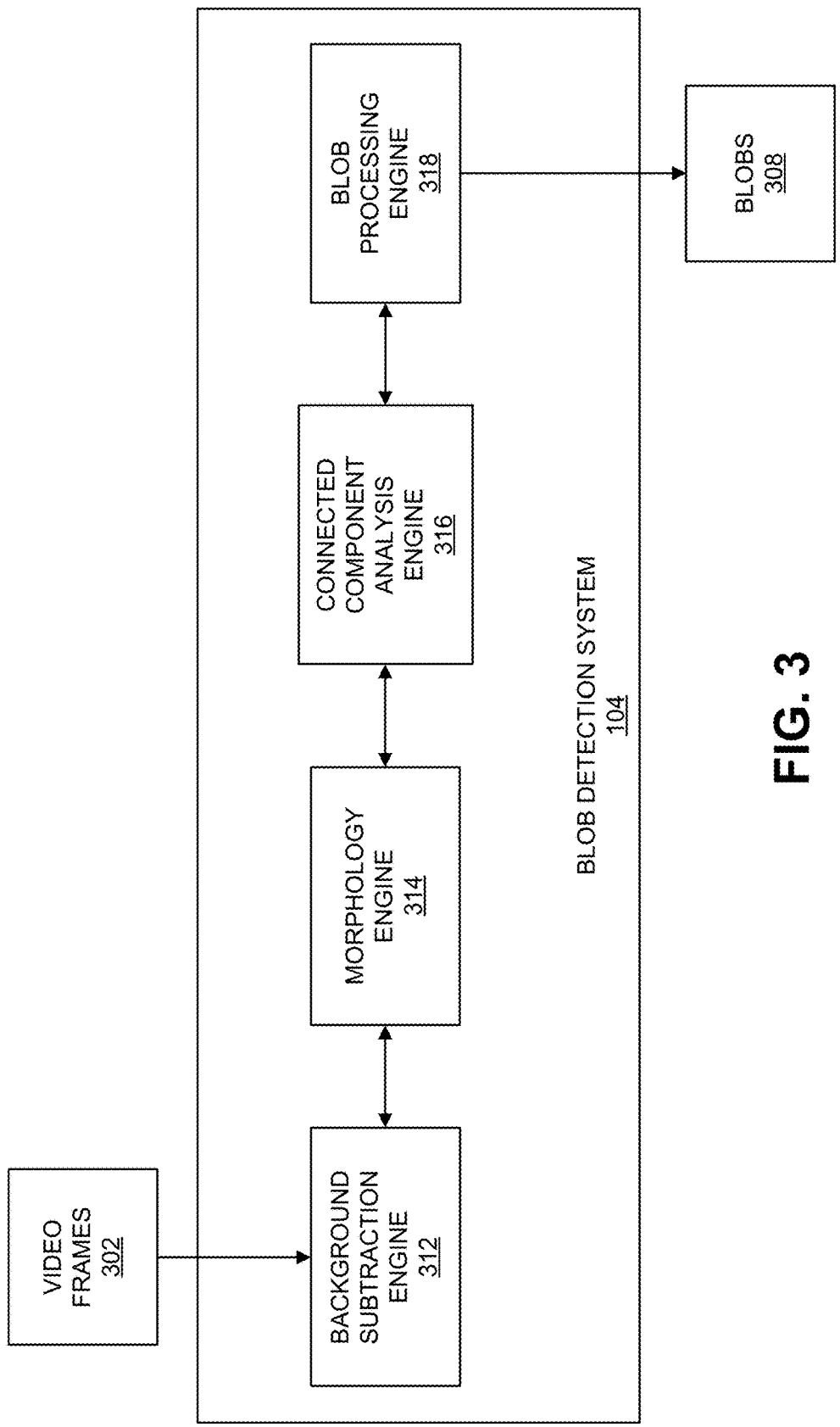
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component
    Insert the connected component in a list of connected components.
    Mark the pixels in the connected component as being processed}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking system 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
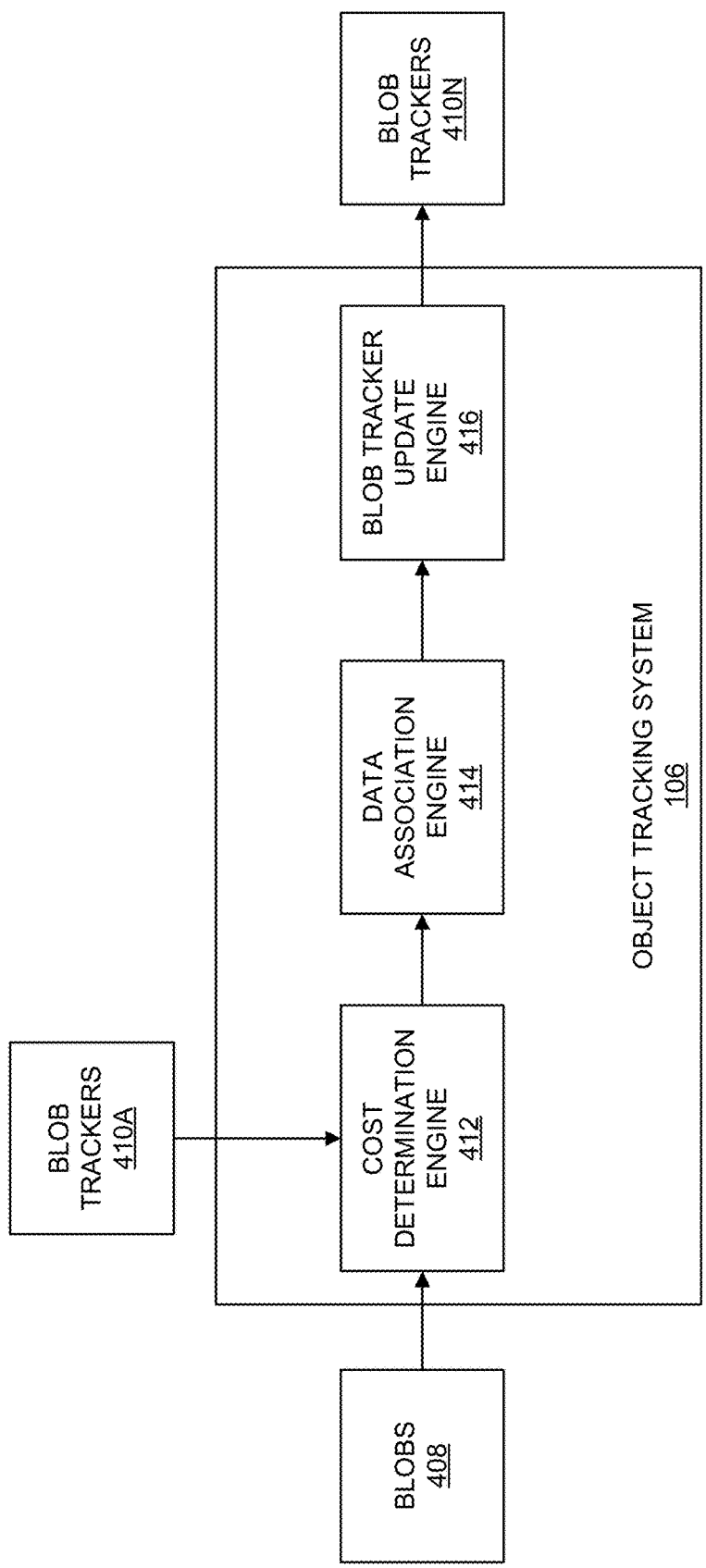
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking system 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$ Equation (2)

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., two or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (denoted as a threshold duration TD1) has passed, the tracker may be promoted to be a normal tracker. A normal tracker (with normal status) and its associated blob are output as an identified tracker-blob pair to the video analytics system. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

The threshold duration TD1 is a duration for which a new blob tracker must be continuously associated with one or more blobs before it is converted to a normal tracker (transitioned to a normal state). The threshold duration can be a number of frames (e.g., at least N frames) or an amount of time. In one illustrative example, the threshold duration can be 30 frames, in which case a blob tracker can be in a new state for 30 frames before being converted to a normal tracker. The threshold duration TD1 can be set to any other suitable number of frames or amount of time. In some cases, if a blob tracker has been continuously associated with blobs for the threshold duration (duration ≥TD1) without becoming hidden or lost, the blob tracker is converted to a normal tracker by being transitioned from a new status to a normal status. In some cases, a tracker can be transitioned to lost when the tracker fails to associate with any foreground blobs in a given frame. In some cases, the tracker can be transitioned to dead when the tracker fails to associate with any foreground blobs for a certain duration (e.g., a certain number or frames or a duration of time). A hidden tracker may refer to a tracker that was previously normal (thus independent), but later merged into another tracker.

As described above, blob detection can be performed for one or more video frames to generate or identify blobs representing one or more objects for the one or more video frames. The background subtraction component of the blob detection encounters issues when dealing with sleeping objects. A sleeping object is an object that is moving through a scene and that eventually becomes stationary or static. For example, a car can enter a scene by driving into a parking lot and then parking in a parking spot. Once the car parks, it can become a sleeping object. A blob and the object represented by the blob can be detected and tracked based on background subtraction, as long as the object is in motion. However, once the object pauses or stops and becomes a sleeping object, the background subtraction model will transition the pixels of the object from foreground pixels to background pixels due to the nature of background subtraction adapting to local changes quickly. For example, a background subtraction process based on GMM or other statistical learning model adapts to the local changes for each pixel. Once a moving object stops or pauses, for each pixel location making up the object, the same pixel value (due to the pixel value for that location not changing) continues contributing to the associated background model, causing the region associated with the object to become background. Once the pixels making up the object are detected as background by the background subtraction process, the object and its blob fade into the background and can no longer be detected and tracked. A sleeping object thus will not be detected and tracking of the object will be lost for a simple background subtraction based solution.

Figure 5:
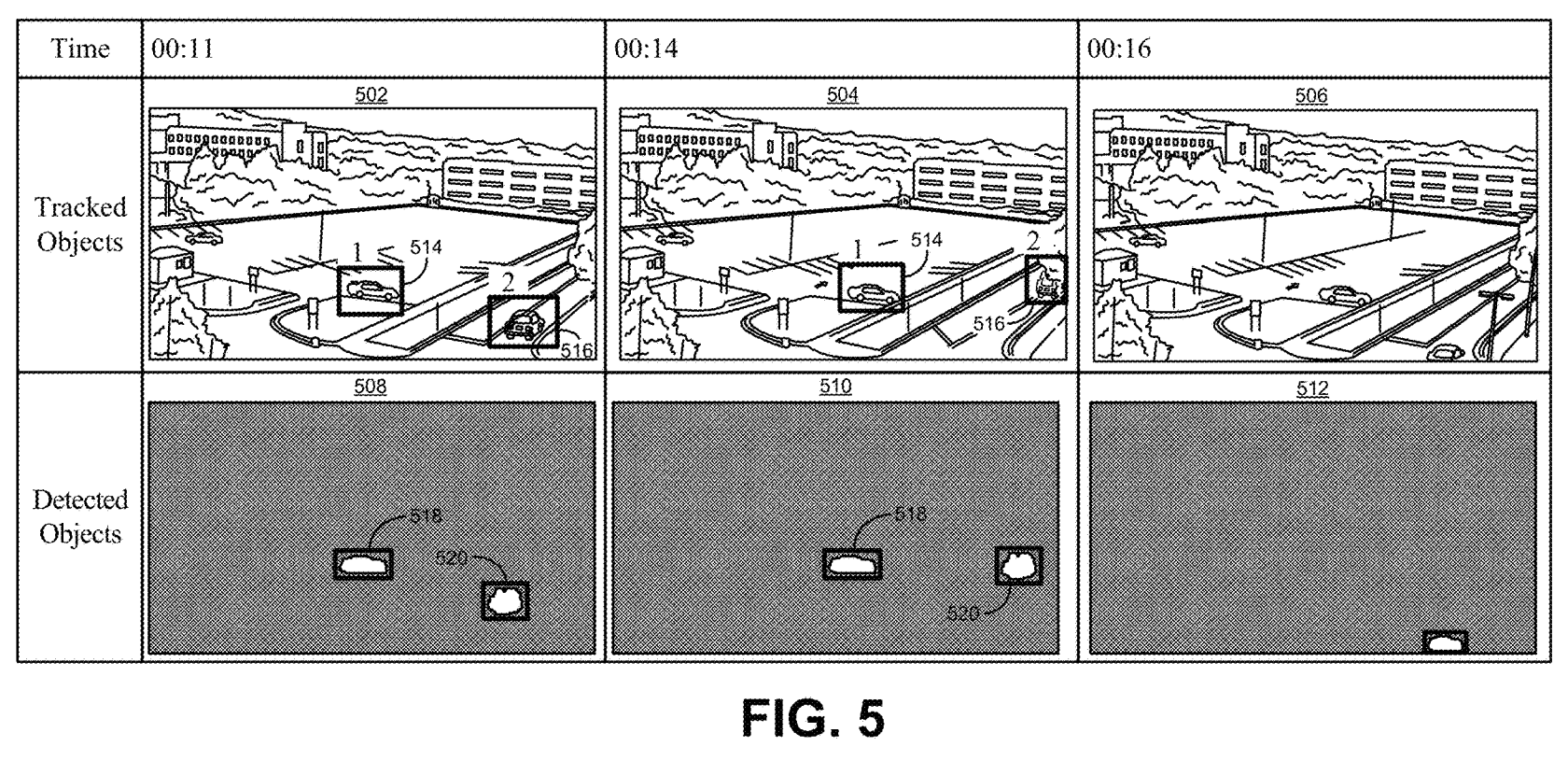

FIG. 5 is an illustration of video frames 502, 504, and 506 of an environment for which a sleeping object is detected and tracked using a simple background subtraction based solution. The frames 502, 504, 506 are shown with tracking results for different time instances of 11 seconds, 14 seconds, and 16 seconds, respectively. The background pictures 508, 510, and 512 (e.g., after blob analysis) are also shown with the object detection results of each time instance.

In the example shown in FIG. 5, a first moving car being tracked by a tracker bounding box 514 and a second moving car being tracked by a tracker bounding box 516 are detected in frame 502 at time instance 00:11. The two cars are detected as the blobs surrounded by blob bounding box 518 and blob bounding box 520, respectively, as shown in the background picture 508. The first car (tracked by tracker bounding box 514) continues moving until approximately frame 504 at time instance 00:14. The object tracking system can correctly detect and track the first car until that time (00:14), as illustrated by the blob bounding box 518 in the background picture 510 and by the tracker bounding box 514 in the frame 504. However, since the first car stopped moving from time instance 00:14 forward, the background subtraction model starts to learn the background models of the pixel locations related to the first car such that the foreground pixels soon become background pixels due to the nature of background subtraction, as noted above. The second car continues moving as each of the frames 502, 504, 506 are captured, and thus is detected and tracked for all three frames as illustrated by the blob bounding box 520 in the background pictures 508, 510, 512 and by the tracker bounding box 516 in the frames 502, 504, 506.

Some solutions for the sleeping tracker problem are based on modification of the background subtraction process. Another less accurate solution is to exclude foreground pixels from the update process. However, such a solution will disable the adaptability of such pixel locations and lead to false positives (e.g., when the object starts to move again). Similarly, simply adjusting the parameters of background subtraction so that the foreground objects fade slowly into the background will not solve the problem.

A first solution for the issue of sleeping objects is based on changing the background models by enabling multiple models and adapting the model update for foreground regions. For example, in the first type of solution, multiple models (e.g., similar to GMM) are firstly used. In addition, to update the model of a current pixel location of a foreground object, instead of using the current pixel value of the current pixel location, a different pixel is derived to replace the current pixel value. Such a different pixel value is chosen so that it is a value of a background pixel and so that the model parameters of the different pixel value are the most similar to the model of the foreground pixels. Using such a solution, a stopped object can turn to a sleeping object more slowly.

A second solution for sleeping objects is to adjust the parameters of the background subtraction model based on whether the current pixel is foreground or background (without changing the input pixel value). In the second type of solution, parameters of the background subtraction are changed. Multiple models for each pixel location are not necessarily required. This type of solution, however, requires the tracking system to provide as feedback the blob level information of the foreground objects and to apply a much slower learning speed (by adjusting e.g., the learning rate) for the foreground objects.

The prior solutions for sleeping object detection have various issues. One issue is that these solutions lead to much higher complexity in background subtraction. For example, the first solution described above replaces the input to the background model with a different pixel value, and searches for the different pixel value from one or more nearby background regions. This leads to a large computational complexity increase (in worst case scenario) since GMM and other learning-based background subtraction techniques are often expected to be done by a Digital Signal Processor (DSP) or a Graphics Processing Unit (GPU), in which case parallelism is enabled and the worst case scenario is very important. Further, even in simple solutions (such as the second solution described above) that only require re-calculation of the learning rate, the process is done for each pixel, leading to a rather complex process, especially for non-software only solutions. Even further, background modeling happens for each pixel, so any conditional calculation is very expensive to implement.

Another issue is that the prior solutions lead to potentially high latency and/or data transfer rates. For example, the second solution requires the background subtraction modeling process (e.g., GMM) to take the object tracking results as input. Because of this, the latency in the object tracking side will be carried over and thus will be reflected by background subtraction. In video surveillance and other applications of video analytics, background subtraction is one of the first steps, and thus the latency of the background subtraction modeling process (e.g., GMM), as well as its dependency on other parts of video analytics (e.g., the tracking layer), should be minimized. Furthermore, background subtraction (e.g., GMM) requires high memory bandwidth to transfer the data from heterogeneous computing devices, and any additional information from other video analytics modules (e.g., tracking) to background subtraction will be multiplied by the number of pixels in background subtraction, which significantly impacts the data transfer rate.

As noted above, the prior solutions for sleeping object detection delay a stopped object from turning to a sleeping object. However, such an object can still disappear (in which case the object is not detected) after a certain period of time even when such solutions are applied, resulting in the problem not being completely resolved.

Methods and systems are described herein for detecting sleeping objects. The methods and systems provide a low-complexity, yet robust solution to detect such sleeping objects, without modifying the background subtraction model and without introducing pixel level complexity. For example, using the methods and systems described herein, sleeping objects may be detected at the blob level (after blob detection). Once a sleeping object is detected, even though the object is faded into the background, there can be special methods in the tracking layer to continuously maintain and thus track the sleeping object in the video analytics system.

In some examples, a sleeping object can be detected, in part, by comparing bounding boxes of a blob tracker that is tracking the object across multiple frames. For example, it can be determined whether the bounding boxes of the tracker are becoming smaller across the frames, indicating that the object being tracked is being absorbed (or vanishing) into the background based on the background subtraction process. Detection of the sleeping object can be further based on a comparison of color characteristics (e.g., in an appearance model maintained for the tracker) of pixels included in bounding boxes of the blob tracker in a number of the frames. For example, the sleeping object detection system can maintain and periodically update an appearance model together with a target sleeping bounding box of the tracker. Once there is a sign that that the object is being absorbed into the background, the target sleeping bounding box (instead of the current bounding box) can be used to update or re-calculate the appearance model using pixels of the current frame within the target sleeping bounding box. The updated appearance model can be compared with an appearance model maintained for the tracker. If the comparison determines the texture is unchanged, the object can be considered a sleeping object. Such a comparison of color characteristics can ensure that the object the tracker is tracking (the sleeping object) remains in the scene.

Figure 6:
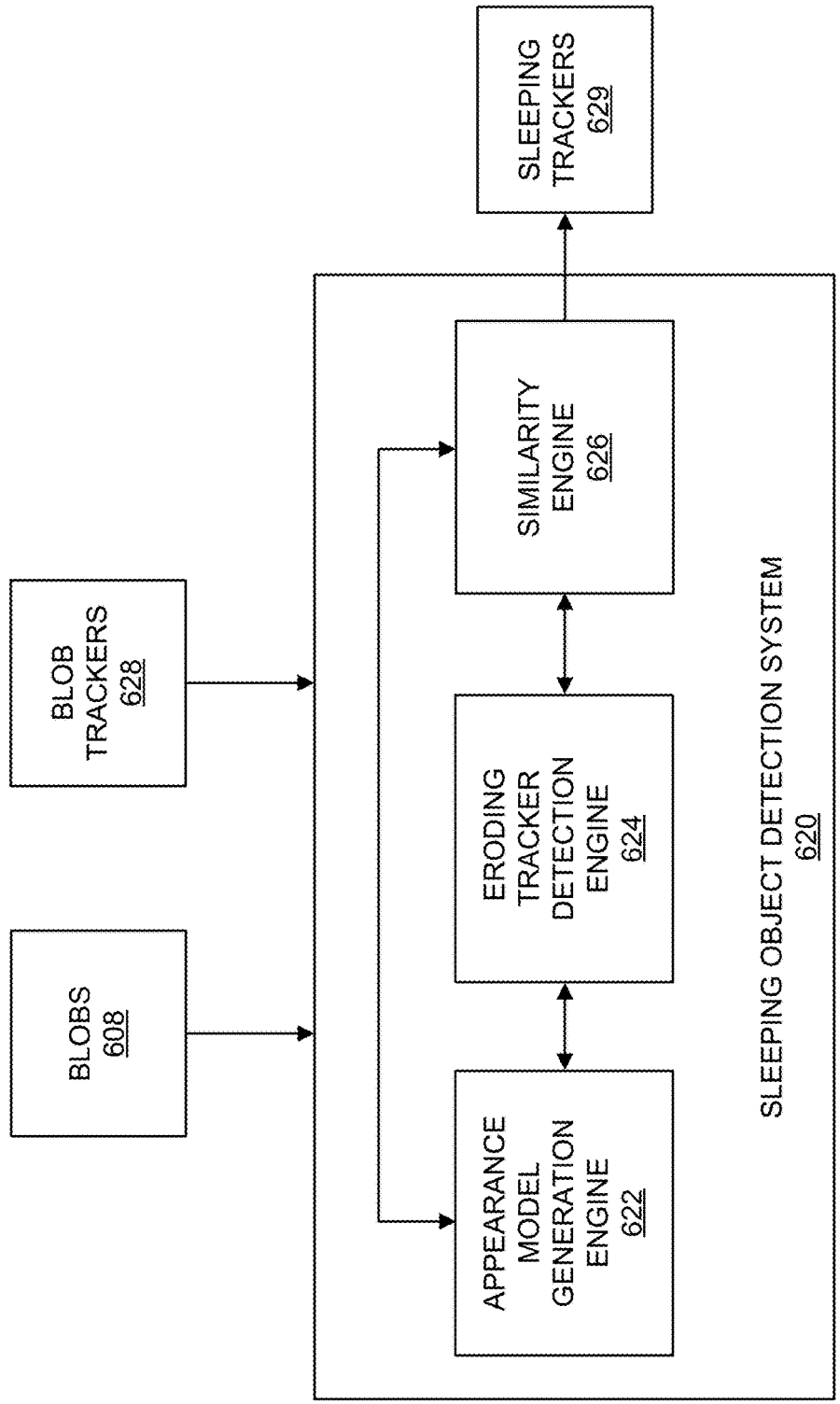
FIG. 6 is a block diagram illustrating an example of a sleeping object detection system, in accordance with some examples.

FIG. 6 shows an example of a sleeping object detection system 620 that can be used to perform a sleeping object detection process. A detailed example of the sleeping object detection process is described below with respect to FIG. 7A and FIG. 7B. The sleeping object detection system 620 includes an appearance model generation engine 622, an eroding tracker determination engine 624, and a bounding box comparison engine 626. The sleeping object detection process can be performed on a frame-by-frame basis. The sleeping object detection system 620 receives as input the blobs 608 and the blob trackers 628. For example, the blobs 608 can include the blobs detected for one or more frames of a video sequence. The blob trackers 628 can include the blob trackers for the one or more frames of the video sequence. A blob tracker for a current frame can be the tracker before or after data association has been performed (e.g., before or after a Kalman filter update based on locations of blobs in a current frame). The output of the sleeping object detection system 620 includes the sleeping trackers 629. The sleeping object detection system 620 can be part of the tracking system (e.g., tracking system 106), or can be a separate component from the tracking system. For example, the sleeping object detection system 620 can be separate from the object tracking system, in which case the sleeping trackers 629 can be output to the object tracking system so that the object tracking system can continue to track the sleeping objects. In other examples, the sleeping object detection system 620 can be part of (or integrated with) the object tracking system. For instance, the sleeping object detection system 620 may perform sleeping object detection after data association is performed by the data association engine 414. The sleeping trackers 629 determined for a current frame can also be provided for use by the tracking system to perform data association for a next frame (e.g., to associate the sleeping trackers to blobs in the next frame).

The appearance model generation engine 622 can determine appearance models for bounding boxes of the blob trackers 628. An appearance model of a bounding box can include one or more color characteristics of pixels included in the bounding box. For example, the one or more color characteristics can include a color feature space of pixels in the bounding box, a color mass center of pixels in the bounding box, any other suitable color characteristic, or a combination thereof. Color characteristics of appearance models are described in more detail below. The appearance model of a bounding box can be determined based on the pixels of a given frame that are included in the bounding box of the blob tracker. For example, the one or more color characteristics of a tracker bounding box can be calculated using the values of pixels within the bounding box.

The eroding tracker detection engine 624 can perform an eroding tracker detection process to detect whether bounding boxes of a tracker are shrinking over a number of frames (or eroding). The eroding tracker detection process can include a size inclusion test and a significant size decrease test. For example, the eroding tracker detection engine 624 can perform a size inclusion test by comparing a current bounding box of a tracker (in a current frame) with a previous bounding box of the tracker (in a frame obtained earlier in time than the current frame) to determine if the current bounding box is within the previous bounding box. In some examples, the current bounding box is determined to be within the previous bounding box when a size of the current bounding box is smaller than a size of the previous bounding box. In some examples, the current bounding box is determined to be within the previous bounding box when a size of the current bounding box is smaller than a size of the previous bounding box and when the boundaries of the current bounding box are entirely within the boundaries of the previous bounding box.

In some examples, the location in the current frame of the current bounding box of the blob tracker can be determined so that the eroding tracker detection engine 624 can determine if the current bounding box is within the previous bounding box. In some implementations, the location of the current bounding box in the current frame can be determined using the location of the blob that the tracker is associated with in the current frame. In some implementations, the location of the current bounding box in the current frame can be determined using a predicted location of the blob tracker, which is based on one or more previous locations of the tracker in one or more previous frames. For instance, as described above, the predicted location of a blob tracker in a current frame can include a location in a previous frame of a blob with which the blob tracker was associated.

In some examples, the previous bounding box can include a bounding box from any frame obtained before the current frame. In some examples, the previous bounding box can include a target sleeping bounding box (also referred to herein as a target bounding box or previous bounding box). A target bounding box of a tracker is a bounding box for a frame that meets an appearance model duration. For example, the appearance model duration can be a threshold set to a certain number of frames (e.g., 15 frames, 30 frames, 60 frames, or other suitable number of frames). The appearance model duration can be implemented using a counter or other mechanism. In one illustrative example, the appearance model duration can be set to 30 frames, in which case a target bounding box can be set for a particular tracker every 30 frames.

When the size inclusion test is successful for a tracker (the current bounding box of the tracker is determined to be within the previous bounding box), the eroding tracker detection engine 624 can perform the significant size decrease test to determine whether there has been a significant size decrease of the tracker's bounding boxes across frames. For example, the eroding tracker detection engine 624 can compare a size of the current bounding box of the tracker (in a current frame) with a size of a previous bounding box of the tracker (in a previous frame) to determine if the current bounding box is significantly smaller than the previous bounding box. As noted above, the previous bounding box can include a bounding box from any frame obtained before the current frame, or can include a target bounding box. The significant size decrease of a current bounding box can be based on a threshold amount as compared to the size of the previous bounding box. In some examples, the threshold amount can include a percentage size of the previous bounding box (e.g., 30%, 40%, 50%, or other suitable percentage). In one illustrative example, the current bounding box can be determined to be significantly smaller than the previous bounding box when the size of the current bounding box is smaller than the size of the previous bounding box by 50% or more (e.g., the current bounding box is at least half the size of the previous bounding box). The tracker can be determined to be a vanishing or eroding tracker when a significant size decrease is determined to have occurred to a bounding box of the tracker. In some cases, a state of the tracker can be set to vanishing or eroding.

In some examples, in addition to comparing the size of the current bounding box of the tracker with the size of the previous bounding box of the tracker, the eroding tracker detection engine 624 can determine if there has been a threshold number of bounding boxes or frames (e.g., at least three, four, five, or other suitable number of bounding boxes) involved in the eroding tracker detection process. In such examples, the tracker is considered a vanishing or eroding tracker when a bounding box is determined to have undergone a significant size decrease and when the threshold number of bounding boxes has been analyzed in the eroding tracker detection process.

The similarity engine 626 can compare appearance models of bounding boxes of a tracker to determine if color characteristics of the bounding boxes are similar enough to consider the tracker as a sleeping tracker. In some examples, the appearance model for the tracker can be updated and compared to a previous appearance model of the tracker once there is a clear sign that that the object is being absorbed into the background (based on the eroding tracker detection process). Such a comparison of color characteristics can ensure that the texture of the object the tracker is tracking (the potential sleeping object) remains unchanged, which can indicate that the object remains in the scene at the location it became stationary. In one illustrative example, the appearance model generation engine 622 can determine an initial appearance model of a target bounding box of the tracker using pixels of an initial frame. The initial frame is the frame at which the target bounding box was designated as the target bounding box (after the appearance model duration). The appearance model generation engine 622 can further determine a current appearance model of the target bounding box using pixels of the current frame. The similarity engine 626 can compare the current appearance model to the initial appearance model and can determine if the current and initial appearance models are within a threshold difference of one another to determine if the texture is unchanged. In such an example, the target sleeping bounding box (instead of the current bounding box) is used to re-calculate the appearance model of the current frame within the target sleeping bounding box, and the re-calculated appearance model is compared with the maintained initial appearance model.

The threshold difference can be set to a percentage of a dimension of the target bounding box (e.g., a percentage of the diagonal length of the bounding box). The percentage can include any suitable percentage, such as 5%, 10%, 15%, 20%, or other suitable percentage. In some examples, if the current and initial appearance models are within the threshold difference, the tracker is considered a sleeping tracker and is transitioned to a sleeping state or status. For instance, if the comparison determines that the texture is unchanged (based on the threshold difference), the object tracked by the tracker may be detected as a sleeping object. In some examples, if the current and initial appearance models are within the threshold difference, the tracker can be maintained in the vanishing state (instead of being transitioned to the sleeping state). In such examples, if the tracker is later detected as lost, the sleeping object detection system 620 can check if the tracker has a vanishing status. If the tracker has a vanishing status, the sleeping object detection system 620 can perform the similarity detection sub-process (described below) again, and if the similarity detection sub-process is successful, the tracker will be transitioned to a sleeping state or status. Further details of the sleeping object detection process are described below with respect to FIG. 7A and FIG. 7B.

Figure 7A:
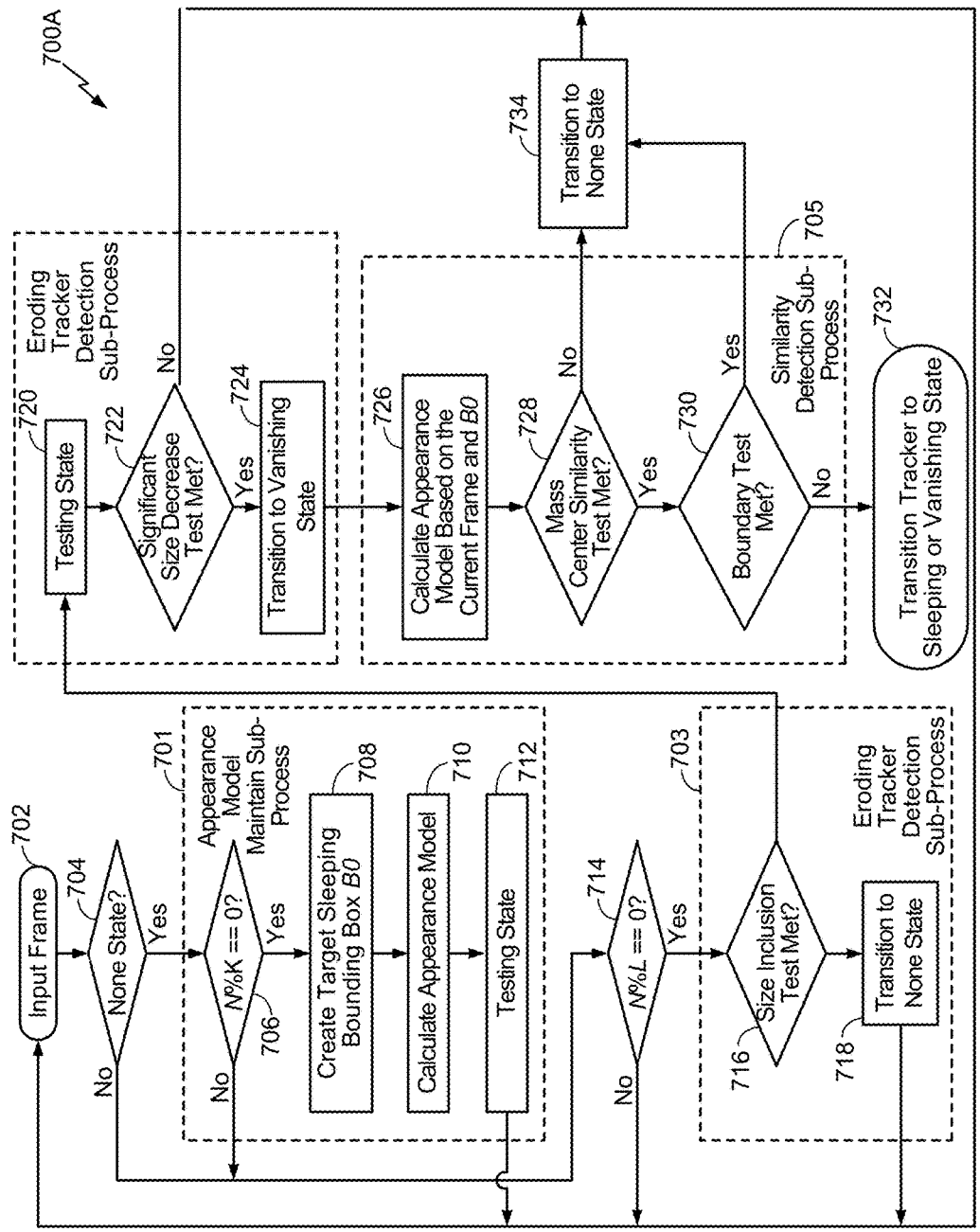
FIG. 7A is a flowchart illustrating an example of a process of detecting sleeping objects and trackers, in accordance with some examples.

FIG. 7A is a flowchart illustrating an example of a sleeping object detection process 700A for detecting sleeping objects and trackers in a scene. In some cases, the sleeping object detection system 620 can perform the process 700A. The process 700A can be performed for each frame of a sequence of video frames capturing images of the scene, or for a subset of all frames of the video sequence (e.g., every other frame, every three frames, every ten frames, or other subset). Further, the process 700A can be performed either serially or in parallel for each tracker of each input frame. In one illustrative example, the sequence of video frames can be captured by a video or image capture device (e.g., an IP camera, or other video or image capture device). In some examples, the video frames can be input to the process 700A as the video frames are captured. In some examples, the video frames can be stored in a storage device after being captured, and can be input to the process 700A from the storage device at some point after the frames are captured.

The process 700A includes several sub-processes, including an appearance model maintain sub-process 701, an eroding tracker detection sub-process 703, and a similarity detection sub-process 705. As described in more detail below, the appearance model maintain sub-process 701 can be performed to designate a bounding box of a tracker as a target sleeping bounding box and to calculate an appearance model for the target sleeping bounding box. The eroding tracker detection sub-process 703 can be performed to detect if bounding boxes associated with a certain tracked object and associated tracker are becoming smaller and smaller.

The eroding tracker detection sub-process 703 can also be referred to as a vanishing blob detection sub-process. The similarity detection sub-process 705 can be performed to compare appearance models of bounding boxes associated with a certain tracked object and tracker, and, in some cases, to determine if the tracker is near or intersecting a boundary of a current video frame or picture.

The different sub-processes of the process 700A are performed based on current states of one or more blob trackers associated with the frames of the video sequence and based on defined periods. States of blob trackers can include a "none" state, a "testing" state, a "vanishing" state, a "lost" state, a "sleeping" state, or other suitable state. The appearance model maintain sub-process 701 is performed for blob trackers having a "none" state. Trackers that do not have a "testing," "vanishing," or "sleeping" state will have a "none" state. For trackers having a "testing" state, the eroding tracker detection sub-process 703 is performed. For trackers having a "vanishing" state, the similarity detection sub-process is performed 705. In some cases, a tracker may have both a "lost" state and a "vanishing" state. A tracker can be determined to be lost at a current frame when the tracker has no object to track in the current frame. For example, a tracker can be determined to be lost when a bounding box that the tracker was associated with in a previous frame is no longer in a current frame. In another example, a tracker can be determined to be lost when an object being tracked by the tracker leaves the scene, in which case the tracker may be found to not be associated with a bounding box, and thus may be transitioned to a "lost" state.

Different periods can also be defined for determining when to perform the various sub-processes for a particular tracker. For example, the condition to invoke the appearance model sub-process 701 for a tracker with a "none" state can be a periodical pattern (e.g., N % K is equal to 0 as shown in FIG. 7A). As another example, the condition to invoke the eroding tracker detection sub-process 703 for a tracker with a "testing" state can also be a periodical pattern (e.g., N % L is equal to 0 as shown in FIG. 7A).

Figure 8:
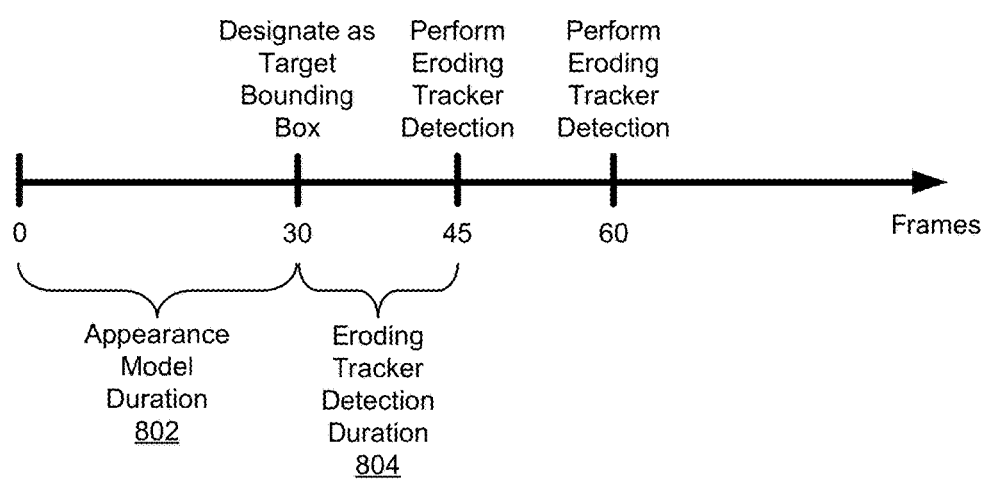
FIG. 8 is a diagram illustrating an example timeline associated with detection of sleeping objects and trackers, in accordance with some examples.

FIG. 8 shows a timeline with one illustrative example of such periods. For example, the periods can include an appearance model duration 802 and an eroding tracker detection duration 804. Determination of whether the appearance model duration 802 is met is represented in FIG. 7A as N % K=0 at step 706. The term K represents the appearance model duration 802. Determination of whether the eroding tracker detection duration 804 is met is represented in FIG. 7A as N % L=0 at step 714. The term L represents the eroding tracker detection duration 804. The term N can represent a counter for the current tracker (the tracker currently being processed). In one illustrative example, the initial number of the counter N can be made random, and the counter N can be increased by a value of 1 for every frame. Once the counter N reaches the relevant period (e.g., the appearance model duration 802 or the eroding tracker detection duration 804), the corresponding sub-process is invoked. In another illustrative example, the counter N can have an initial value of 0, and can be incremented by a value of 1 for each input frame that is input to the process 700A. In yet another illustrative example, the counter N can have an initial value equal to the relevant period (e.g., the appearance model duration 802 or the eroding tracker detection duration 804), and can be decremented by a value of 1 for each input frame that is input to the process 700A.

As described in more detail below with respect to FIG. 7A, the appearance model duration 802 defines when the appearance model maintain sub-process 701 is performed for a tracker having a "none" state, and thus when a bounding box is designated as a target sleeping bounding box and when an appearance model is calculated for the target sleeping bounding box. The eroding tracker detection duration 804 defines when the eroding tracker detection sub-process 703 is performed for a tracker having a "testing" state. The appearance model duration 802 and the eroding tracker detection duration 804 can include the same period (e.g., amount of frames or time period), or can include different periods. For example, as illustrated in FIG. 8, the appearance model duration 802 can be set to a period of 30 frames, while the eroding tracker detection duration 804 can be set to a period of 15 frames.

Returning to FIG. 7A, a current input frame is received at step 702. The current input frame can be one frame from the sequence of video frames, and can be referred to herein as the current frame. At step 704, the process 700A includes determining whether the states of one or more blob trackers for the current frame have a "none" state. The states of the trackers associated with the current frame can be checked serially or in parallel. For trackers associated with the current frame that have the "none" state, the appearance model duration (denoted as N % K) is checked to determine whether to perform the appearance model maintain sub-process 701. For example, if the appearance model duration has been met for a current tracker (N % K=0), step 708 of the appearance model maintain sub-process 701 is performed. Once a tracker is in the "none" state, the initial bounding box after the appearance model duration is met is kept as a target sleeping bounding box. For example, at step 708, a target sleeping bounding box B0 is created for the current tracker by designating the initial bounding box of the current tracker as the target sleeping bounding box B0. The current frame at which at which the target bounding box is designated as the target bounding box is referred to herein as the initial frame. The initial bounding box is the first bounding box of the current tracker after the appearance model duration is met at 706 (the bounding box of the initial frame). The target sleeping bounding box B0 is also referred to herein as a target bounding box B0. The target bounding box B0 can be used as a reference for comparison with other bounding boxes of the current tracker that track the same object as the target bounding box B0 in subsequent frames. The remaining steps of process 700A are discussed with reference to the bounding boxes of the current tracker in the initial frame and in one or more subsequent frames obtained after the initial frame. However, one of ordinary skill will appreciate that the steps can also be performed for other trackers of the current frame.

Once a target sleeping bounding box is created, an appearance model of the target sleeping bounding box is created for the initial frame (the frame at which the target bounding box was designated as the target bounding box) using pixels of the initial frame. For example, at step 710, the process 700A includes calculating an appearance model for the target bounding box B0 of the current tracker. In some cases, step 710 can be performed by the appearance model generation engine 622. The appearance model calculated for the target sleeping bounding box B0 using pixels of the initial frame is denoted as the initial appearance model. The appearance model can be updated by calculating appearance models for bounding boxes of the tracker in one or more subsequent frames obtained after the initial frame. In some implementations, an appearance model may be calculated for each bounding box of the tracker at each frame. In some implementations, for the purpose of detecting the sleeping objects, lower frequency updating of the appearance model can be sufficient because, once the object starts to fade into the background, it may take seconds to complete the process 700A, and a delay of several frames in the initial stage (of the fading) may not cause huge bounding box differences in terms of both location and size.

An appearance model of a bounding box includes one or more color characteristics of the pixels included in the bounding box. For example, the one or more color characteristics can include a color feature space of pixels included in the bounding box, a color mass center of pixels included in the bounding box, or a combination thereof. In some examples, the color feature space can be the quantized color spaces, using the luminance (Y) and hue (H) components of an HSV color space. In some examples, the features of the feature space may be from the Y, U and V components of a YUV color space (e.g., the YUV 4:2:0 space, YUV 4:4:4 space, YUV 4:2:2 space, or other suitable YUV color space). In some examples, the color mass center of the appearance model of each bounding box can be calculated by counting the mass center of the feature space applied to the pixels within the bounding box. For instance, a color probability model can first be determined by calculating the probability of the feature value in each pixel location, and then the mass center of all pixels within the whole bounding box can be calculated according to the per-pixel probability model.

In some cases, when calculating the color probability model, the color space of the bounding box may need to be quantized so that the probability model is limited to contain only up to a fixed number of entries (e.g., 1024 for Y and H component or 2048 for YUV). In some cases, when calculating the color mass center, the pixel locations may also need to be quantized. For example, when contributing to the calculation of the mass center, the X and Y coordinate may be quantized (e.g., by a right shift of 2 (divided by 4), or other suitable amount) such that the bounding box is divided into small grids. Even though each pixel within a grid may have a different probability, each pixel's coordinates are considered the same when calculating the mass center. Using such quantized pixel locations can allow the process 700A to be more robust to distortions (e.g., a small phase shift of the pixels of input images).

Detailed implementations are now described as illustrative examples. An illustrative example of an implementation of the YUV color probability model includes (Note that this process establishes an appearance model which is illustrated by the array of HIST):
  1. Initialize the color histogram HIST to all zeros.
  2. For each pixel P in the bounding box, get its Y, U, V components, each components are 8 bits.
  3. Quantize the YUV components as Y=Y>>3, U=U>>5, V=V>>5; [with >> being a right bit shift operator]
  4. The HIST index is given by idx=(Y<<6)±(U<<3)+V; [with << being a left bit shift operator]
  5. Then increase the HIST(idx) by 1.
  6. Finally, HIST is normalized by the bounding box size.

An illustrative example of an implementation of the mass center calculation includes:
  1. Initialize the mass center (CX, CY) as (0, 0). Set the sum of probability P_SUM=0.
  2. Given the color histogram HIST, for each pixel P in the bounding box, get its Y, U, V components and do the following:
  3. Quantize the YUV components as Y=Y>>3, U=U>>5, V=V>>5;
  4. The HIST index is given by idx=(Y<<6)+(U<<3)+V;
  5. P_SUM=P_SUM+HIST(idx)
  6. Get the pixel coordinates X and Y.
  7. Update the mass center as CX=CX+(X>>2)*HIST(idx), CY=CY+(Y>>2)*HIST(idx).
  8. Finally, normalize the (CX, CY) by the P_SUM.

In the frame the appearance model is just calculated for, the mass center can be calculated (similarly as in step 6 and step 7) in order to know the initial mass center of the appearance model. In some cases, the appearance model of each bounding box is designed in a way that all pixels of a bounding box are maintained. In other cases, the appearance model of each bounding box is designed in a way that it is always of a constant size regardless of the bounding box size. In such cases, the possibility of uncontrollable memory increase is avoided, which may occur when multiple large bounding boxes exist.

In some cases, once the target sleeping bounding box B0 is set for the current tracker at step 708, the current tracker is transitioned to the "testing" state at step 712. In some cases, the current tracker is transitioned to the "testing" state (at step 712) once the appearance model is calculated at step 710 for the target sleeping bounding box B0. At a later point in time, if the state of the current tracker is transitioned to the "none" state (e.g., after the size inclusion test at step 716, after the significant size decrease test at 722, after the mass center similarity test at step 728, or at some other point during the process 700A), the target sleeping bounding box for the current tracker will be changed to another bounding box of the current tracker for a different initial frame. While the current tracker is in the "testing" state, a bounding box history of the tracker is maintained that includes each bounding box of the tracker in one or more subsequent frames after the initial frame. In some cases, the bounding boxes within the history for the tracker present a shrinking behavior of the tracker when the tracker is tracking an object in motion that becomes stationary in the scene (a potential sleeping tracker). The bounding box history of a tracker is kept and is updated as subsequent input frames (after the initial frame) and associated bounding boxes of the tracker are processed. By keeping and updating the history of bounding boxes for the tracker, it is ensured that once the detection of a vanishing tracker is confirmed (during the eroding tracker detection sub-process 703 below), the original bounding box at the time instance (or frame) the object became vanishing is available.

The eroding tracker detection sub-process 703 is applied once the tracker is in the "testing" state and the eroding tracker detection duration has been met (e.g., once for every L frames, such as every 15 frames, every 30 frames, or the like). For example, at step 714, the eroding tracker detection duration is checked for the current tracker in one or more subsequent frames (determined based on the eroding tracker detection duration) after the initial frame at which the target bounding box was designated, and if the eroding tracker detection duration has been met (N % L==0), the eroding tracker detection sub-process 703 is performed. In some examples, the frequency of eroding tracker testing (the eroding tracker detection duration) can be made higher than the frequency of the appearance model maintain sub-process 701 (the appearance model duration), as shown in FIG. 8. In some examples, the eroding tracker detection duration and the appearance model duration include the same period (e.g., same number of frames or same time period).

The eroding tracker detection sub-process 703 includes comparing a tracker's bounding box of a newly received input frame (now the current frame) to the bounding boxes of the same tracker but in previous frames (e.g., the target sleeping bounding box). For example, the eroding tracker detection sub-process 703 can include a size inclusion test (performed at step 716) and a significant size decrease test (performed at step 722).

Once the eroding tracker detection duration is determined to have been met at step 714 (e.g., a threshold number of frames has been received), the size inclusion test is performed at step 716 on a current bounding box of the current tracker for the current frame. For a vanishing tracker (and potentially a sleeping tracker), the region of the bounding box in the current frame should be within the bounding box of a previous frame (e.g., the target sleeping bounding box). The size inclusion test can be applied to determine whether the current bounding box of the current frame is included in a previously tested bounding box of the same tracker. For example, the previously tested bounding box can include the target bounding box B0 of the current tracker.

In one illustrative example, the size inclusion test compares the current bounding box of the current tracker with the target sleeping bounding box B0 of the current tracker. In some examples, the size inclusion test can be based on sizes of the current and target bounding boxes. In such examples, the current bounding box is determined to be within the target bounding box B0 when a size of the current bounding box is smaller than a size of the target bounding box B0. In some examples, the size inclusion test can be based on sizes of the current and target bounding boxes as well as the location of the current bounding box relative to the target bounding box. In such examples, the current bounding box is determined to be within the target bounding box B0 when the size of the current bounding box is smaller than the size of the target bounding box B0 and when the boundaries of the current bounding box are entirely within the boundaries of the target bounding box B0. The location of the current bounding box can be the current tracker's identified location in the current frame (based on a blob location the tracker is associated with in the current frame) or the current tracker's predicted location from a previous frame (a location in the previous frame of a blob with which the blob tracker was associated).

If the current bounding box is determined to be included in the target sleeping bounding box B0 or other previous bounding box (a "yes" decision is made at step 716), the inclusion test is successful and the state of the tracker can be maintained or transitioned to a "testing" state at step 720. However, if the current bounding box is determined to not be included in the target sleeping bounding box B0 or other previous bounding box (a "no" decision is made at step 716), the inclusion test fails and the state of the tracker can be transitioned to the "none" state at step 718. For example, if the size inclusion condition is not met, the eroding tracker detection sub-process 703 terminates by transitioning the tracker to the "none" state at step 718.

The significant size decrease test is applied at step 722 when the current tracker is maintained or transitioned to the "testing" state at step 720 (after the size inclusion test is successful). The significant size decrease test can be performed to determine whether there has been a significant size decrease of the current tracker's bounding boxes since the initial frame at which the target bounding box B0 was designated. For example, a size of the current bounding box of the current tracker can be compared to a size of a previous bounding box of the tracker (in a previous frame) to determine if the current bounding box is significantly smaller than the previous bounding box. In some cases, the previous bounding box can be the target bounding box B0 of the current tracker. In some cases, the previous bounding box can include a bounding box (of the current tracker) from any frame obtained between the initial frame and the current frame.

The significant size decrease test can be based on a threshold amount of size reduction in the current bounding box as compared to the size of the target bounding box B0 (or other previous bounding box). For example, the threshold amount can include a percentage size (e.g., 30%, 40%, 50%, or other suitable percentage) of the target bounding box B0. In one illustrative example, the current bounding box can be determined to be significantly smaller than the target bounding box B0 (a significant size decrease has occurred) when the size of the current bounding box is at least 50% smaller than the size of the target bounding box B0. In such an example, if the current bounding box is at least half the size of the target bounding box B0, the current bounding box is determined to have undergone a significant size decrease as compared to the target bounding box B0.

In some examples, in addition to comparing the size of the current bounding box of the tracker with the size of the previous bounding box of the tracker, the significant size decrease test can further determine if there has been a threshold number of bounding boxes or frames (e.g., at least three, four, five, or other suitable number of bounding boxes) involved in the eroding tracker detection sub-process 703 for the current tracker (e.g., since the current target bounding box B0 for the current tracker was created). In one illustrative example, the significant size decrease test is met when the current bounding box has undergone a significant size decrease and if there have been at least three (or other suitable number) bounding boxes involved in the eroding tracker detection sub-process 703 for the current tracker.

The current tracker can be determined to be a vanishing or eroding tracker when the significant size decrease test is met by the current bounding box (e.g., the current bounding box is determined to have undergone a significant size decrease and, in some cases, when the threshold number of bounding boxes has been analyzed in the eroding tracker detection sub-process 703). For example, the state of the current tracker can be transitioned from a "testing" status to a "vanishing" or "eroding" status at step 724 when the significant size decrease test is satisfied (a "yes" decision) at step 722.

If the significant size decrease test is not met at step 722 (a "no" decision), the state of the current tracker can be maintained in the "testing" state. Input frames are then received until the next eroding tracker detection duration is met at step 714 (e.g., a threshold number of frames has been received). A new current bounding box of a new current frame can then be analyzed using the size inclusion test and, if the size inclusion test is met, using the significant size decrease test.

The similarity detection sub-process 705 is performed for trackers having a "vanishing" status. The similarity detection sub-process 705 can be performed, in part, to verify that the object or blob being tracked by the current tracker (the potential sleeping object) remains in the same location in the scene as it was located when the target sleeping bounding box B0 was created. In some cases, the similarity detection sub-process 705 can also determine if the current tracker is within a certain distance of a boundary of the frame or picture, or if the current tracker is intersecting the boundary.

The similarity detection sub-process 705 calculates, at step 726, an appearance model using the pixels of the current frame based on the target sleeping bounding box B0. The appearance model calculated for the target bounding box B0 using the pixels of the current frame is referred to as the current appearance model. For example, the current appearance model is calculated using the pixels in the current frame that the target bounding box B0 would contain if included in the current frame. At step 728, a mass center similarity test is performed. The mass center similarity test includes comparing a similarity between the current appearance model and the initial appearance model. As previously described, the initial appearance model is the appearance model calculated at step 710 for the target bounding box B0 using pixels of the initial frame for which the target bounding box B0 was designated.

In one illustrative example of the mass center similarity test, the probability color histogram model for the initial appearance model is denoted as M, and the corresponding mass center for the initial appearance model is denoted as C0. The probability color histogram model M can be used to calculate the mass center C of the current appearance model. For example, the mass center C can be calculated using the example mass center calculation described above. The histogram (denoted as HIST above, illustrating the appearance model) can be calculated in a previous frame using the example appearance model calculation above. Values of C and C0 are then compared to determine how close together the values are. If C0 and C are very close to each other, according to a similarity threshold, the corresponding tracker is detected as a sleeping object tracker. In some examples, the mass center similarity test can be denoted as |C0−C|<α, (wherein |•| is, e.g., the L-2 norm) for some α>0 (wherein α is the similarity threshold). In one illustrative example, the similarity threshold α may be set to be a percentage (e.g., 5%, 10%, 15%, or other suitable percentage) of the diagonal length of the target sleeping bounding box B0. For example, if the difference between the mass center C of the current bounding box and the mass center C0 of the initial bounding box is within the threshold percentage of the diagonal length of the target sleeping bounding box B0, the similarity between the mass centers C and C0 meets the mass center similarity test.

If the similarity between the mass centers C and C0 is not sufficient (a "no" decision at step 728), the current tracker is transitioned to a "none" state at step 734. For a future iteration of the process 700A for the current tracker, step 704 will result in a "yes" decision and the appearance model maintain sub-process 701 can be performed to create a new target sleeping bounding box for the current tracker.

In some implementations, if the similarity between the mass centers C and C0 is sufficient (a "yes" decision at step 728), the current tracker is detected to be a sleeping object tracker (at step 732) that is tracking a sleeping object. For example, the current tracker can be transitioned to a "sleeping" state at step 732. In such implementations, the sleeping tracker can then be output to a tracking system (e.g., object tracking system 106) so that the tracking system can continue tracking the sleeping object. For example, the tracker can be shown as tracking the sleeping object with a bounding box that is in the same location as the target sleeping bounding box, or in a location of a bounding box of a frame received after the initial frame for which the target bounding box was designated.

In some implementations, after the similarity detection sub-process 705 is performed, the current tracker can be kept as a vanishing tracker until the current tracker is detected to be lost. As noted previously, a tracker can be determined to be lost for a current frame when the tracker has no object to track in the current frame (e.g., when a bounding box that the tracker was associated with in a previous frame is no longer in the current frame, when an object being tracked by the tracker leaves the scene, or the like). In such implementations, if the similarity between the mass centers C and C0 is sufficient (a "yes" decision at step 728), the current tracker is maintained in the vanishing state at step 732 (instead of being transitioned to the sleeping state). If the tracker is later detected as being lost, the sleeping object detection system 620 can check if the tracker has a vanishing status. If the tracker has a vanishing status, the sleeping object detection system 620 can perform the similarity detection sub-process 705 again for the current tracker. If the similarity detection sub-process 705 determines the similarity between the mass centers C and C0 is sufficient (and, in some cases, determines the tracker is not too close to a boundary, as described below), the tracker will be transitioned to a sleeping state.

Figure 7B:
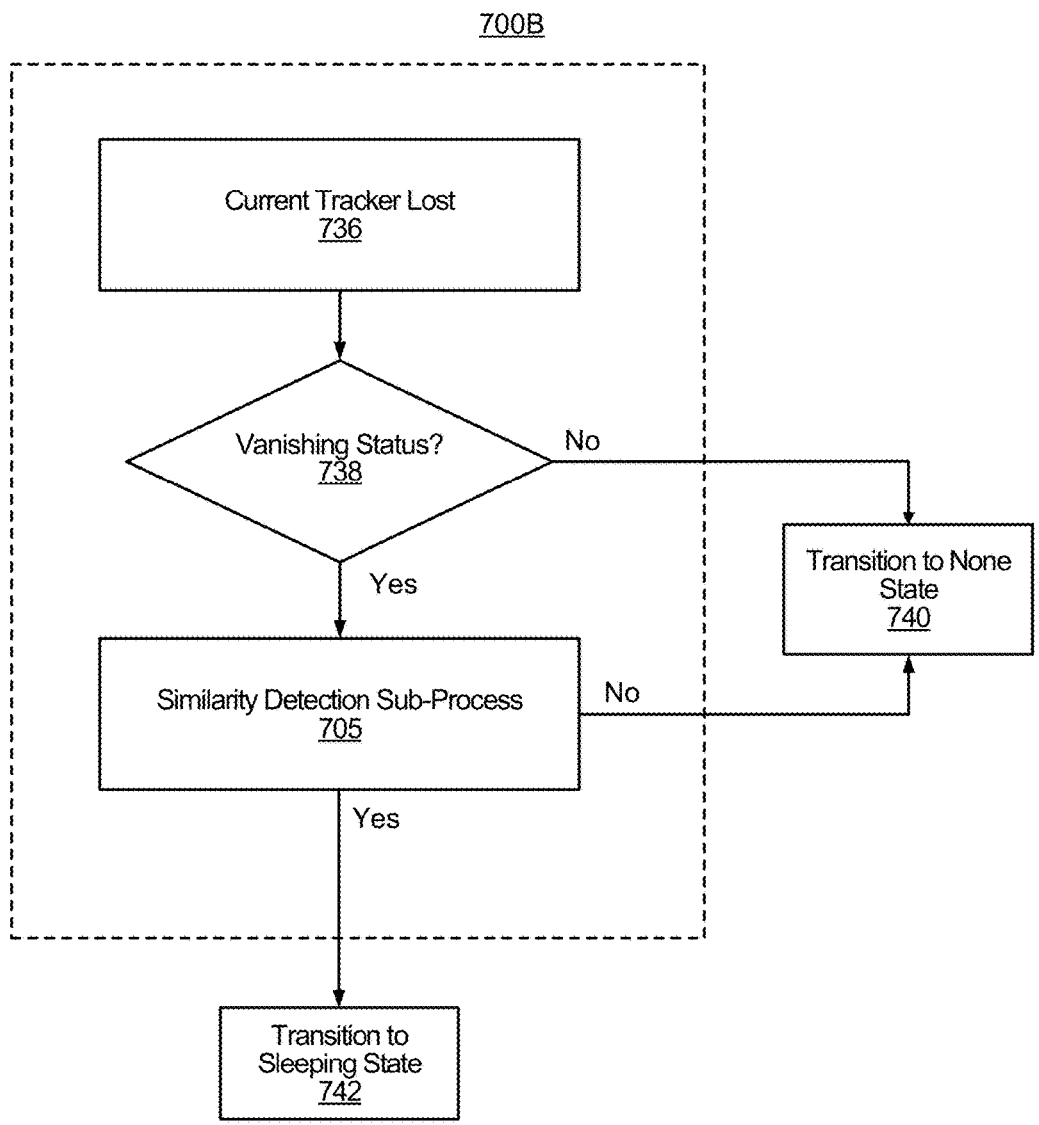
FIG. 7B is a flowchart illustrating another example of a process of detecting sleeping objects and trackers, in accordance with some examples.

The process 700B shown in FIG. 7B can be performed to determine whether to transition the current tracker to the sleeping state. At step 736, the current tracker is determined to be lost in a subsequent frame obtained after the current frame for which the frame was determined to be vanishing. For example, it can be determined that the current tracker is not associated with any bounding box in the current frame, in which case the tracker is determined to be lost. When the tracker is determined to be lost, the process 700B can determine whether the current tracker has a vanishing status at step 738. If the current tracker is determined to have a vanishing status (a "yes" decision at step 738), the similarity detection sub-process 705 can be performed again for the current tracker. For example, the appearance model can be updated (a new current appearance model) using the pixels of the subsequent frame based on the target sleeping bounding box B0, and a new mass center similarity test can be performed using the updated appearance model. The similarity detection sub-process 705 can then determine whether the similarity between updated mass center C and the initial appearance model mass center C0 is sufficient (and, in some cases, to determine the tracker is not too close to a boundary, as described below). If step 728 determines the mass centers C and C0 are similar enough, the tracker will be transitioned to a sleeping state at step 742. At step 738, if the current tracker is determined not to have a vanishing status, current tracker is transitioned to the none state at step 740. If the similarity detection sub-process 705 is not satisfied (e.g., the mass centers C and C0 are not similar enough or the tracker is too close to a boundary), the current tracker is transitioned to the none state at step 740.

As referenced above, in some implementations, the similarity detection sub-process 705 can also perform a boundary test at step 730. In some implementations, the boundary test may not be performed. The boundary test can be performed since behaviour similar to that of a sleeping object might be performed by an object that is close to leaving a scene, has partially left the scene, or that recently left the scene. For example, in each of these cases, the bounding boxes of the tracker tracking the object will become smaller, and the mass center similarity test will likely be satisfied. In such cases, the boundary test can detect if a moving object is close to a picture boundary or leaving the picture (intersecting the picture boundary). A picture boundary can include the boundary of a frame capturing the scene, a portion of the scene that is displayed, or other suitable boundary. In one illustrative example, if the distance of the tracker to a boundary of the picture (e.g., a left boundary, a top boundary, a right boundary, a bottom boundary, a left-top boundary, a right-bottom boundary, or other suitable boundary) is less than a threshold distance (e.g., within 20% of the width and/or height of the target sleeping bounding box B0) or has already been partially outside of the picture boundary, the tracker is considered to have just left the scene instead of being still. If the object is detected as being close to the picture boundary (within the threshold distance) or intersecting the picture boundary, the tracker is not identified as a sleeping object tracker. For example, the tracker can be transitioned to the "none" state at step 734. If the object is detected as not being close to the boundary or not intersecting the boundary, the tracker can be transitioned to the sleeping state or maintained in the vanishing state, as described above.

As illustrated in FIG. 7A, once a tracker has gone through the "vanishing" status, it is either maintained in the vanishing status, detected as a sleeping object tracker with a sleeping status, or its status is set to "none", in which case the process 700A analyzes future frames for possible sleeping objects. In some cases, as an alternative, when a tracker having a "vanishing" state is not detected as a sleeping object tracker (e.g., the mass center similarity test fails at step 728), the appearance model together with the target sleeping bounding box of the current tracker can be updated and the current tracker can be transitioned to the "testing" state. In such cases, the frequency of the appearance model update can be increased when the tracker is already in the "vanishing" state, allowing more chances to capture at least part of an object turning into a sleeping object. For example, as noted previously, the eroding tracker detection duration can be shorter than the appearance model duration in some implementations.

Figure 9:
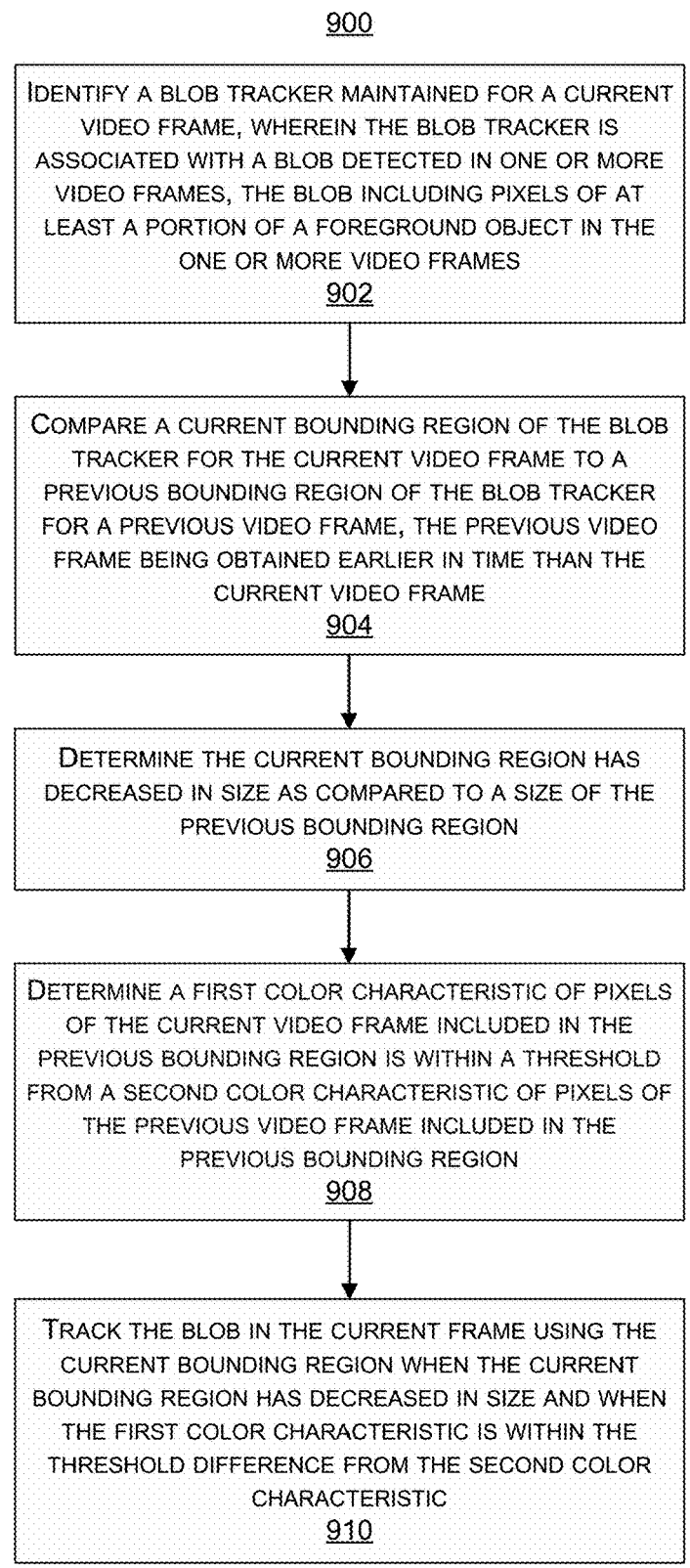
FIG. 9 is a flowchart illustrating an example of a process of maintaining blob trackers for one or more video frames, in accordance with some examples.

FIG. 9 illustrates an example of a process 900 of maintaining blob trackers for video frames using the sleeping object detection techniques described herein. At block 902, the process 900 includes identifying a blob tracker maintained for a current video frame. The blob tracker is associated with a blob detected in one or more video frames. The blob includes pixels of at least a portion of a foreground object in the one or more video frames. At block 904, the process 900 includes comparing a current bounding region of the blob tracker for the current video frame to a previous bounding region of the blob tracker for a previous video frame. The previous video frame is obtained earlier in time than the current video frame. The previous bounding region can be referred to as a target bounding region. The current bounding region can be a bounding box, and the previous bounding region can also be a bounding box (e.g., a target bounding box). Any other suitable type of bounding region can be used for the current and previous blob tracker bounding regions. For example, the bounding regions can include bounding boxes, bounding circles, bounding ellipses, or any other suitably-shaped region representing the associated trackers.

At block 904, the process 900 includes determining the current bounding region has decreased in size as compared to a size of the previous bounding region. In some examples, determining the current bounding region has decreased in size as compared to the size of the previous bounding region includes determining the current bounding region is within the previous bounding region. For example, as described above with respect to the eroding tracker detection sub-process 703, determining whether the current bounding region is within the previous bounding region can include determining a size of the current bounding region is smaller than the size of the previous bounding region and that boundaries of the current bounding region are entirely within boundaries of the previous bounding region. In such examples, determining the current bounding region has decreased in size as compared to the size of the previous bounding region can further include determining, when the current bounding region is within the previous bounding region, the current bounding region has decreased in size by a threshold amount as compared to the size of the previous bounding region. For example, as described above, the significant size decrease test can be based on a threshold amount of size reduction in the current bounding region as compared to the size of a target bounding region (or other previous bounding region). The threshold amount can include, for example, a percentage size (e.g., 30%, 40%, 50%, or other suitable percentage) of the target bounding region. In one illustrative example, the current bounding region can be determined to be significantly smaller than the target bounding region (a significant size decrease has occurred) when the size of the current bounding region is at least 50% smaller than the size of the target bounding region. In such an example, if the current bounding region is at least half the size of the target bounding region, the current bounding region is determined to have undergone a significant size decrease as compared to the target bounding region.

In some examples, the process 900 includes determining bounding regions for the blob tracker have decreased in size as compared to the size of the previous bounding region for a threshold number of frames, in which case the blob is tracked in the current frame using the current bounding region when bounding regions for the blob tracker have decreased in size as compared to the size of the previous bounding region for the threshold number of frames.

At block 906, the process 900 includes determining a first color characteristic of pixels of the current video frame included in the previous bounding region is within a threshold (e.g., a threshold difference) from a second color characteristic of pixels of the previous video frame included in the previous bounding region. In some examples, the first color characteristic includes at least one or more of a color feature space or a color mass center of the pixels of the current video frame included in the previous bounding region. For example, pixels of the current video frame that are included in the previous bounding region (when overlaid onto the current frame) can be used to calculate the color feature space and/or the color mass center. In some examples, the second color characteristic includes at least one or more of a color feature space or a color mass center of pixels of the previous video frame included in the previous bounding region. For example, pixels of the previous video frame that are included in the previous bounding region (when overlaid onto the previous frame) can be used to calculate the color feature space and/or the color mass center.

In some implementations, determining the first color characteristic of the pixels included in the previous bounding region is within the threshold from the second color characteristic of the pixels included in the previous bounding region includes calculating a first appearance model for the blob tracker and calculating a second appearance model for the blob tracker. For example, the first appearance model can include at least one or more of a color feature space or a color mass center of the pixels of the current video frame included in the previous bounding region, and the second appearance model can include at least one or more of a color feature space or a color mass center of the pixels of the previous video frame included in the previous bounding region. Determining the first color characteristic is within the threshold from the second color characteristic can further include comparing the first appearance model to the second appearance model, and determining a difference between the first appearance model and the second appearance model is within the threshold.

In some examples, the first color characteristic is compared to the second color characteristic to determine the first color characteristic is within the threshold from the second color characteristic when it is determined that the current bounding region has decreased in size as compared to the size of the previous bounding region.

At block 908, the process 900 includes tracking the blob in the current frame using the current bounding region when the current bounding region has decreased in size and when the first color characteristic is within the threshold from the second color characteristic. In some implementations, the current tracker is detected to be a sleeping object tracker that is tracking a sleeping object when the current bounding region has decreased in size and when the first color characteristic is within the threshold from the second color characteristic. For example, the process 900 can include transitioning a status of the blob tracker to a sleeping status when the current bounding region has decreased in size and when the first color characteristic is within the threshold from the second color characteristic. The blob is then tracked in the current frame using the current bounding region due to the blob tracker having the sleeping status in the current frame. In such implementations, the blob is tracked in the current frame using the current bounding region when it is determined that the current bounding region has decreased in size and that the first color characteristic of the pixels included in the previous bounding region is within the threshold from the second color characteristic of the pixels included in the previous bounding region, without considering whether the current tracker is lost.

In some implementations, the current tracker can be kept as a vanishing tracker until the current tracker is detected to be lost. In such implementations, the process 900 can include determining the blob tracker is lost, such as by determining the blob tracker is not associated with the blob in the current video frame. For example, the process 900 can include determining the blob tracker is not associated with the blob in the current video frame and determining the blob tracker is lost in the current video frame based on the blob tracker not being associated with the blob in the current video frame. In such implementations, the process 900 can further determine the current bounding region has decreased in size as compared to the size of the previous bounding region and can determine the first color characteristic is within the threshold from the second color characteristic when the blob tracker is determined to be lost in the current frame (e.g., the tracker is not associated with the blob in the current video frame). The blob can then be considered a sleeping object tracker, and can be tracked in the current frame using the current bounding region. For example, the process 900 can include transitioning a status of the blob tracker to a sleeping status when the blob tracker is determined to be lost in the current video frame, when the current bounding region has decreased in size, and when the first color characteristic is within the threshold difference from the second color characteristic. The blob is then tracked in the current frame using the current bounding region based on the blob tracker having the sleeping status in the current frame. Detecting the tracker as a sleeping tracker (corresponding to a sleeping object) in a frame when the tracker (and the blob it was tracking) is lost in the frame can be beneficial because the lost status of the tracker indicates that the foreground of the object (represented by the blob) has been largely or completed absorbed into the background model.

In some implementations, the process 900 includes updating a target bounding region of the blob tracker from the previous bounding region to a subsequent bounding region of a subsequent video frame. The subsequent video frame is obtained later in time than the current frame. In some examples, the process 900 includes updating an appearance model of the blob tracker using information of the subsequent video frame. For example, a new target bounding region can be designated for the blob tracker, and the tracker's appearance model can be updated based on the new target bounding region.

In some cases, the target bounding region and/or the appearance model can be updated when the tracker is no longer in the vanishing state or is in the none state. For example, the process 900 can include determining a size of the subsequent bounding region of the blob tracker for the subsequent video frame has not decreased in size as compared to the size of the previous bounding region, in which case the target bounding region, the appearance model, or both the target bounding region and appearance model are updated when the size of the subsequent bounding region of the blob tracker is determined not to have decreased in size as compared to the size of the previous bounding region. As another example, the process 900 can include determining a color characteristic of pixels included in the subsequent bounding region is not within the threshold from the second color characteristic of the pixels included in the previous bounding region, in which case the target bounding region, the appearance model, or both the target bounding region and the appearance model are updated when the color characteristic of the pixels included in the subsequent bounding region is determined not to be within the threshold from the second color characteristic of the pixels included in the previous bounding region.

In some implementations, the process 900 can include determining whether the blob is within a threshold distance to a boundary of the current video frame. In such examples, the blob is tracked in the current frame using the current bounding region when the blob is not within the threshold distance to the boundary. The blob is not tracked in the current frame (is not considered sleeping) when the blob is within the threshold distance. For example, the tracker can be transitioned to the none state. In some examples, the process 900 can include determining whether the blob is at least partially outside of a boundary of the current video frame, in which case the blob is tracked in the current frame using the current bounding region when the blob is not at least partially outside of the boundary. The blob is not tracked in the current frame (is not considered sleeping) when the blob is at least partially outside of the boundary. For example, the tracker can be transitioned to the none state.

In some examples, the process 900 includes periodically selecting one or more bounding regions of the blob tracker as one or more target bounding regions according to a first period. An example of the first period includes the appearance model duration 802. In some examples, the process 900 includes periodically comparing subsequent bounding regions of the blob tracker to the one or more selected target bounding regions according to a second period. An example of the first period includes the eroding tracker detection duration 804. In some cases, the first period is equal to the second period. In some cases, the first period is less than the second period. In some examples, the process 900 includes updating an appearance model of the blob tracker according to the second period.

In some examples, the process 900 may be performed by a computing device or an apparatus, such as the video analytics system 100. For example, the process 900 can be performed by the video analytics system 100 and/or the object tracking system 106 shown in FIG. 1. The process 900 may also be performed by the sleeping object detection system 620 shown in FIG. 6 (e.g., either integrated with the tracking system or separate from the tracking system). In some cases, the computing device or apparatus may include a processor, microprocessor, microcomputer, or other component of a device that is configured to carry out the steps of process 900. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 900 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The systems and methods described herein enable the detection of sleeping objects, allowing continued tracking of such objects even when background subtraction fades the objects into the background. Various examples are shown in FIG. 10-FIG. 17 comparing video sequences for which sleeping object detection is applied to video sequences for which sleeping object detection is not applied. Eight examples are provided that show sleeping objects being detected using the techniques described herein. In some implementations, the proposed method can be evaluated in an end-to-end IP camera (IPC) system, where the frame level accuracy as well as the object level accuracy are measured by comparing with ground truth. In the examples shown in FIG. 10-FIG. 17, the left columns show the object tracking results when there is no sleeping object detection, and the right columns show the object tracking results when the sleeping object detection is enabled while working on the same image data. It is shown that the proposed sleeping object detection systems and methods are effective at detecting sleeping objects and the overall moving object detection performance is improved.

Figure 10:
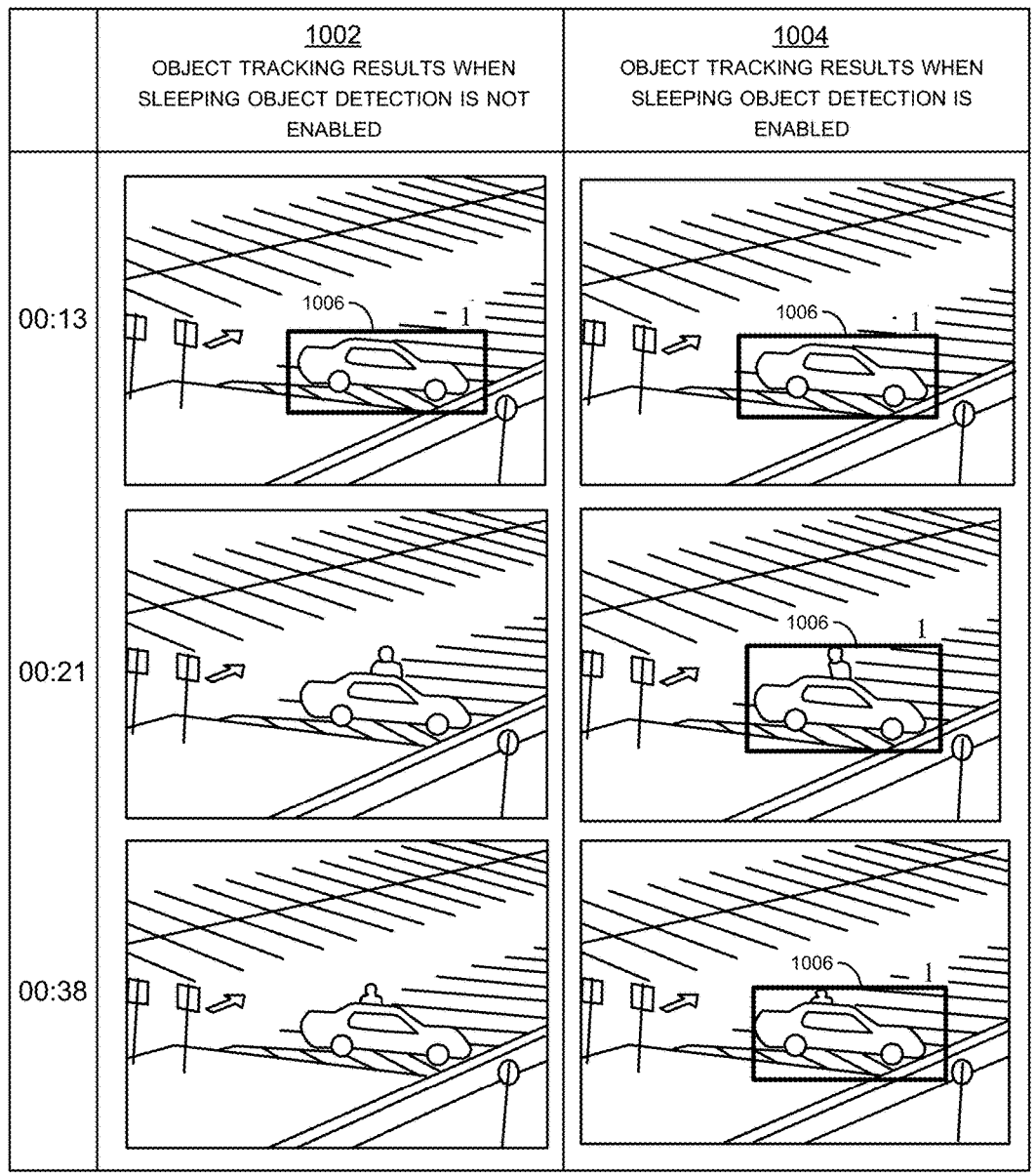
FIG. 10 is an illustration of video frames of an environment in which objects are detected, in accordance with some examples.

FIG. 10 is an illustration of video frames of an environment in which objects are detected. Column 1002 shows object tracking results when sleeping object detection is not performed. At time instance 00:13, the car is detected and tracked by tracker 1006 as the car comes to a stop. However, at time instances 00:21 and 00:38, the car has been faded into the background due to the car becoming stationary for a period of time, and thus is no longer tracked. Column 1004 shows object tracking results when sleeping object detection is enabled and performed. As shown in column 1004, the car is tracked by the tracker 1006 at all three time instances 00:13, 00:21, and 00:38, even though the car has been stationary for a period of time. For example, even if the car object is detected as background by the background subtraction engine, the sleeping object detection allows the car to be tracked.

Figure 11:
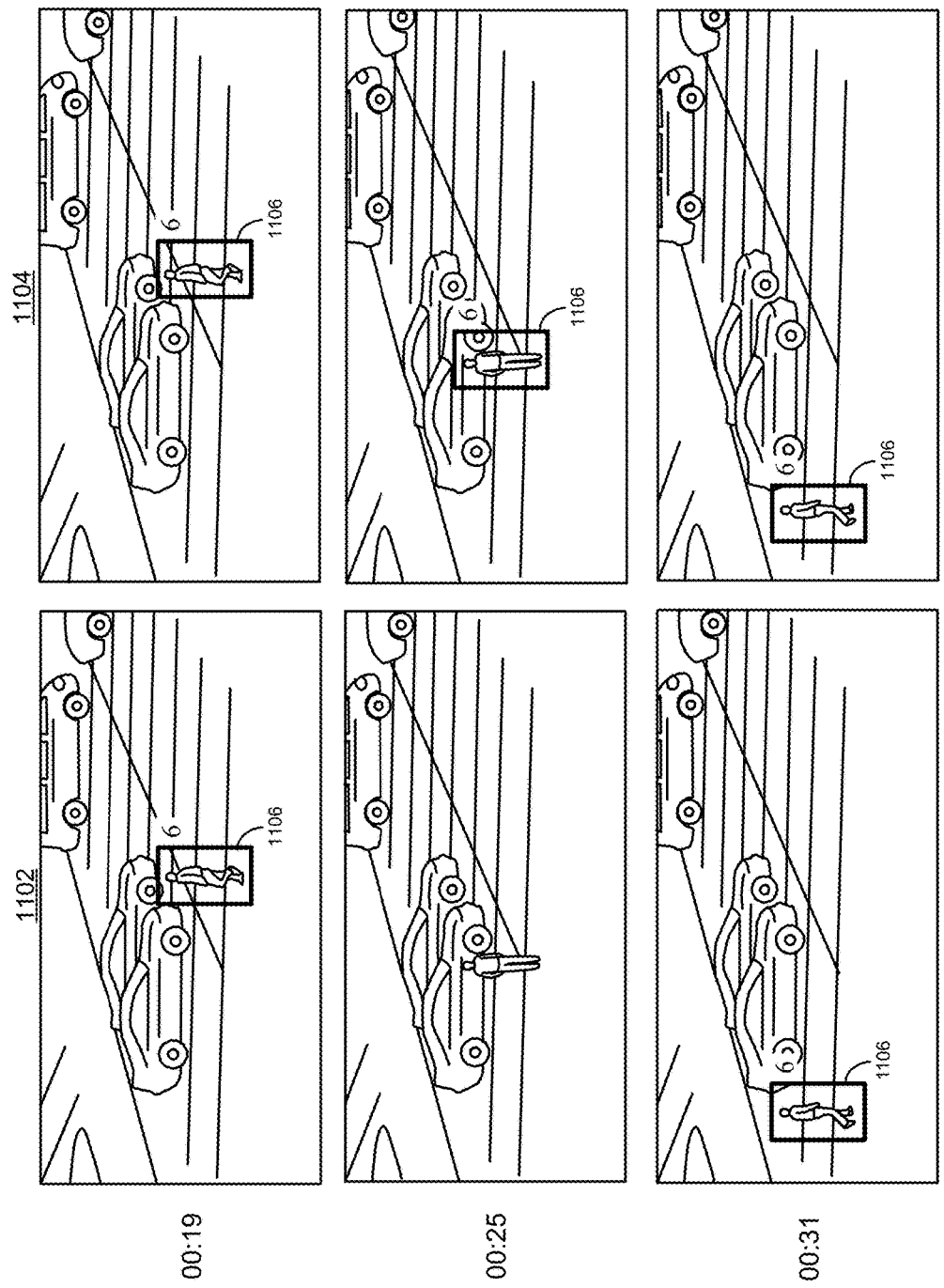
FIG. 11 is an illustration of video frames of an environment in which objects are detected, in accordance with some examples.

FIG. 11 is another illustration of video frames of an environment in which objects are detected. Column 1102 shows object tracking results when sleeping object detection is not performed. At time instance 00:19, the person is detected and tracked by tracker 1106 as the person is waking. At or before the time instance 00:25, the person comes to a stop and is faded into the background, in which case the user is no longer tracked. At time instance 00:31, the person begins moving and is thus again detected and tracked by the tracker 1106. Column 1104 shows object tracking results when sleeping object detection is enabled and performed. As shown in column 1104, the person is tracked by the tracker 1106 at all three time instances 00:19, 00:25, and 00:31 even when the person stops moving for a period of time.

Figure 12:
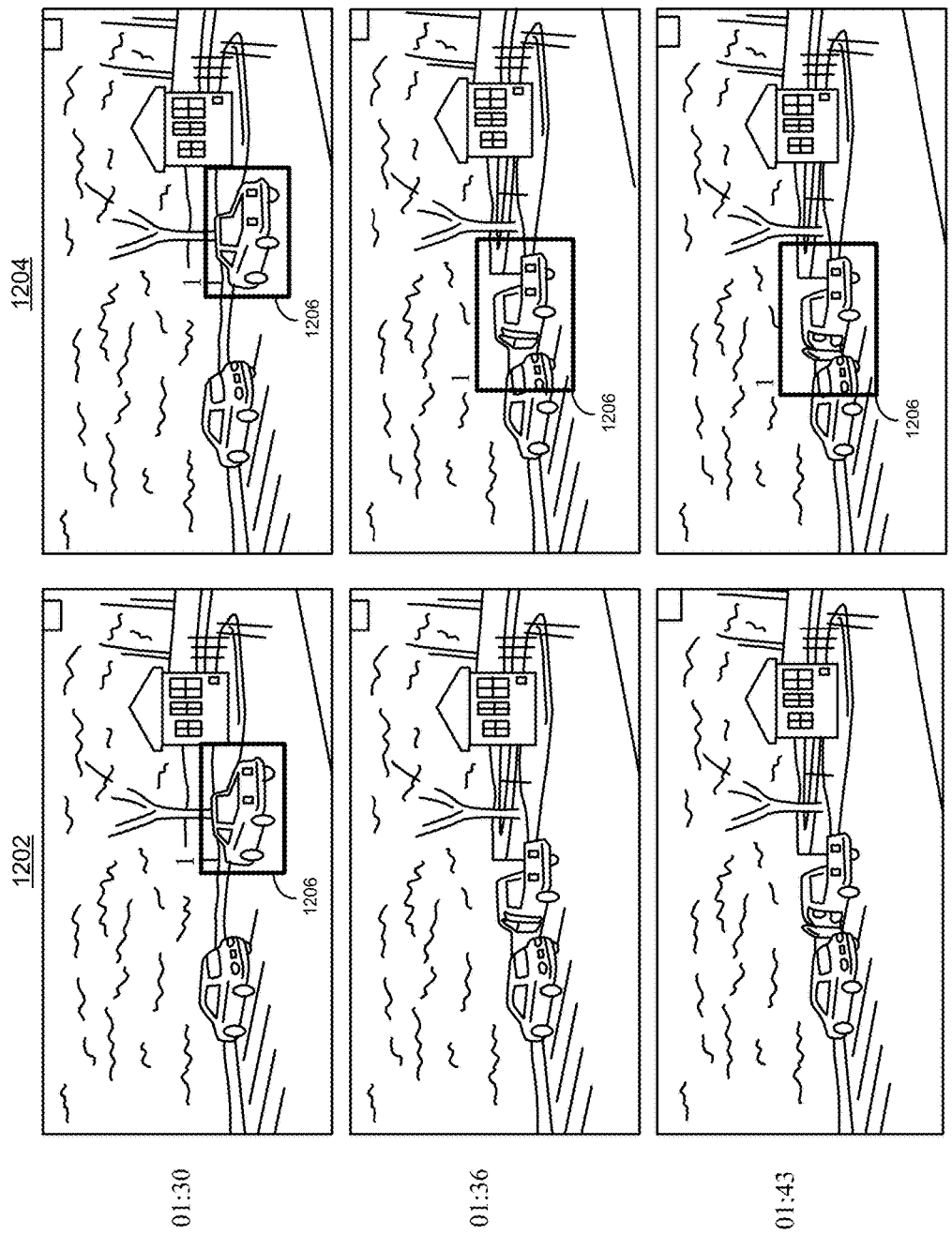
FIG. 12 is an illustration of video frames of an environment in which objects are detected, in accordance with some examples.

FIG. 12 is another illustration of video frames of an environment in which objects are detected. Column 1202 shows object tracking results when sleeping object detection is not performed. At time instance 01:30, the truck is detected and tracked by tracker 1306 as the truck is pulling into a parking space. At or before the time instance 01:36, the truck comes to a stop. Because the truck stops for a certain period of time, background subtraction will fade the truck into the background, and the truck is no longer tracked at time instances 01:36 and 01:43. Column 1204 shows object tracking results when sleeping object detection is enabled and performed. As shown in column 1204, the truck is tracked by the tracker 1206 at all three time instances 01:30, 01:36, and 01:43, despite the truck becoming stationary for a period of time.

Figure 13:
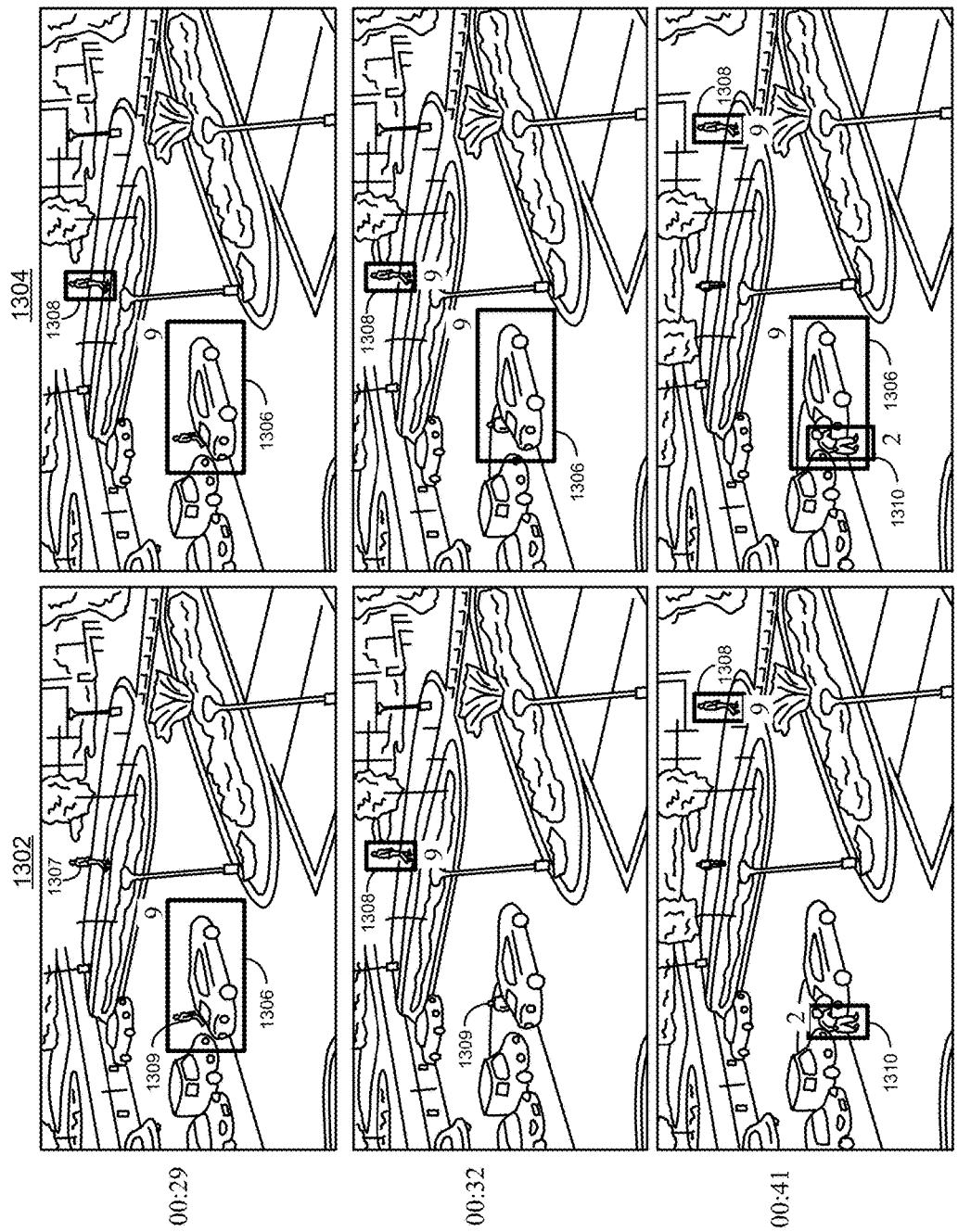
FIG. 13 is an illustration of video frames of an environment in which objects are detected, in accordance with some examples.

FIG. 13 is another illustration of video frames of an environment in which objects are detected. Column 1302 shows object tracking results when sleeping object detection is not performed. At time instance 00:29, a car is detected and tracked by tracker 1306 as the car is moving. Person 1307 and person 1309 are also in the scene, but are not moving at time instance 00:29. The person 1307 and the person 1309 are considered background by the background subtraction process due to the persons 1307 and 1309 being stationary, and thus are not tracked at time instance 00:29. At or before the time instance 00:32, the car comes to a stop and the person 1307 begins moving, causing the car to no longer be tracked and the person 1307 being tracked by the tracker 1308. The person 1309 remains stationary at time instance 00:32, and thus is still not tracked. At or before time instance 00:41, the person 1306 starts moving, and thus is tracked by tracker 1310. The person 1307 continues moving, and continues to be tracked by tracker 1308 at time instance 00:41. The car is still stationary, and thus is not tracked at time instance 00:41. Column 1304 shows object tracking results when sleeping object detection is enabled and performed. As shown in column 1304, the car is tracked by the tracker 1306, the person 1307 is tracked by tracker 1308, and the person 1309 is tracked by tracker 1310 at all three time instances 00:29, 00:32, and 00:41, despite the objects becoming stationary at one or more of the time instances.

Figure 14:
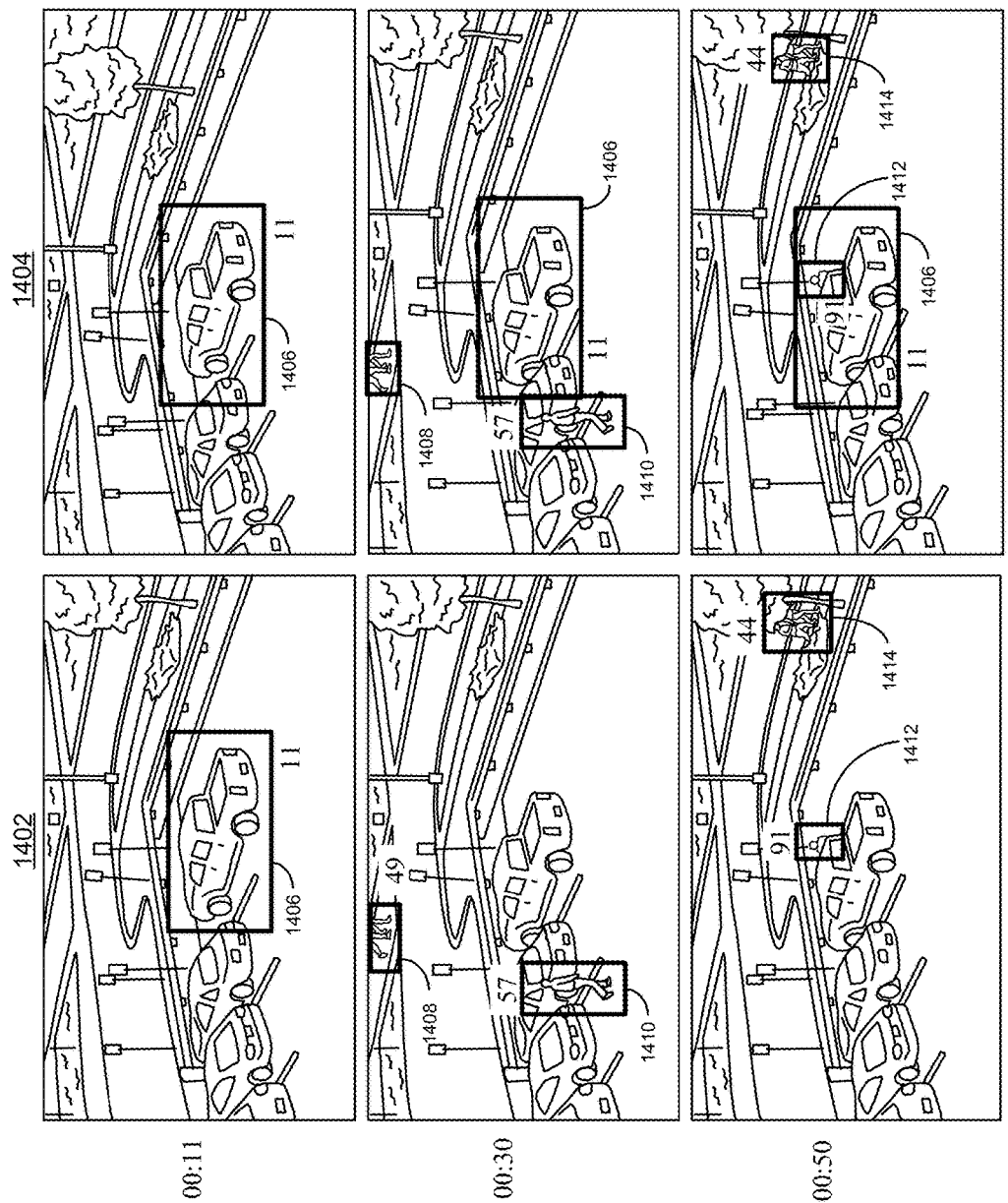
FIG. 14 is an illustration of video frames of an environment in which objects are detected, in accordance with some examples.

FIG. 14 is another illustration of video frames of an environment in which objects are detected. Column 1402 shows object tracking results when sleeping object detection is not performed. At time instance 00:11, a truck is detected and tracked by tracker 1406 as the truck is moving into a parking spot. At or before the time instance 00:30, the truck comes to a stop, causing the truck to no longer be tracked. Also at or before time instance 00:30, people begin moving in the scene, causing a person to be tracked by tracker 1410 and two people to be tracked by tracker 1408. At time instance 00:50, the truck remains stationary, and thus continues to not be tracked due to being faded into the background by background subtraction. Also at or before time instance 00:50, other people begin moving in the scene, causing a person getting out of the truck to be tracked by tracker 1412 and a person walking to be tracked by tracker 1414. Column 1404 shows object tracking results when sleeping object detection is enabled and performed. As shown in column 1404, the truck is tracked by the tracker 1406 in all three time instances, despite the truck becoming stationary at two time instances 00:30 and 00:50. Further, the people are tracked by trackers 1408, 1410, 1412, and 1414 in the two time instances 00:30 and 00:50.

Figure 15:
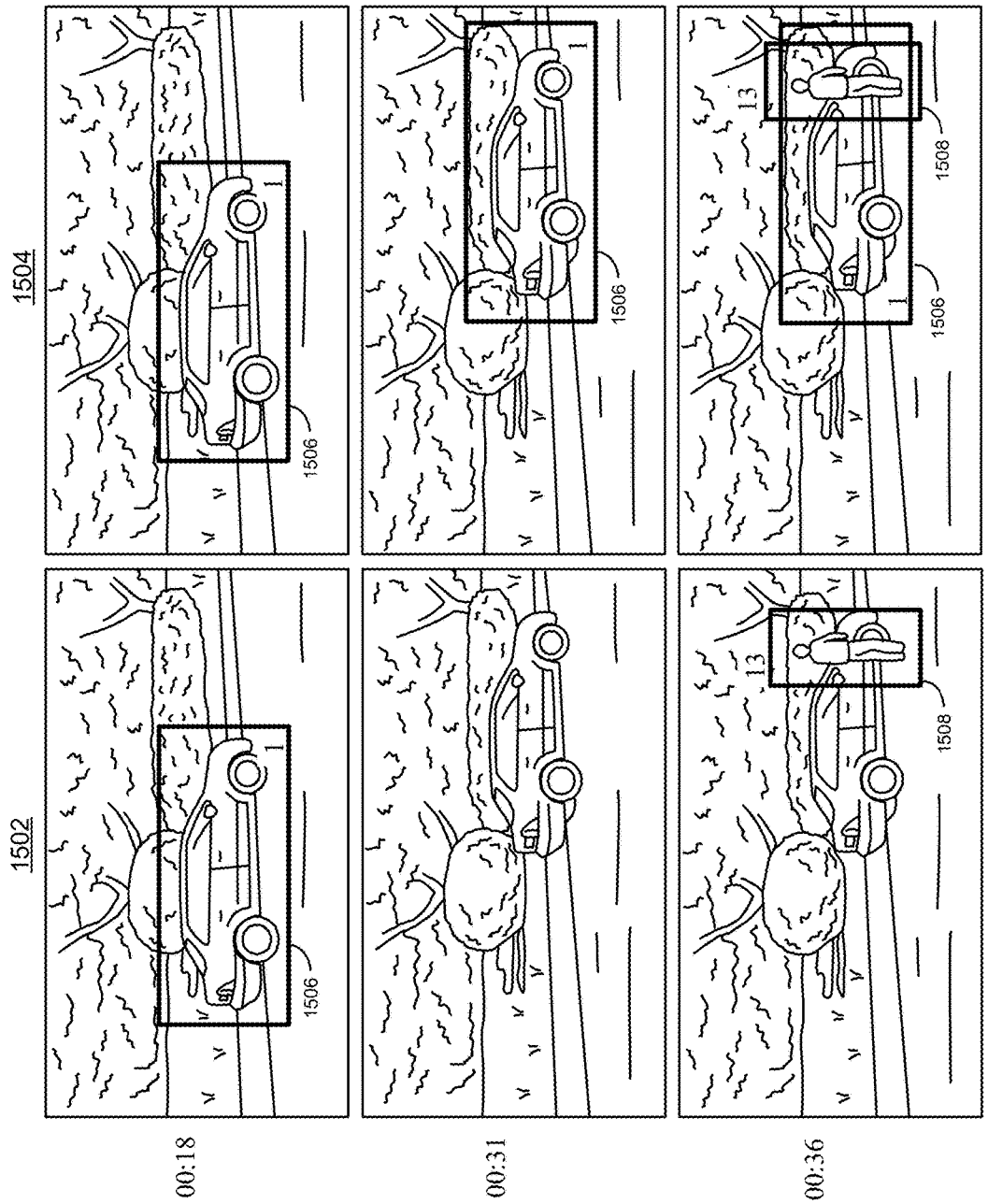
FIG. 15 is an illustration of video frames of an environment in which objects are detected, in accordance with some examples.

FIG. 15 is another illustration of video frames of an environment in which objects are detected. Column 1502 shows object tracking results when sleeping object detection is not performed. At time instance 00:18, a car is detected and tracked by tracker 1506 as the car is moving. At or before the time instance 00:31, the car comes to a stop for a certain period of time, causing the background subtraction process to fade the car into the background. The car continues to remain stopped at time instance 00:36. Because of the background subtraction process fading the car into the background, the car is no longer tracked at time instances 00:31 and 00:36. A person is also tracked by tracker 1508 at time instance 00:36. Column 1504 shows object tracking results when sleeping object detection is enabled and performed. As shown in column 1504, the car is tracked by the tracker 1506 at all three time instances 00:18, 00:31, and 00:36, despite the car being stopped.

Figure 16:
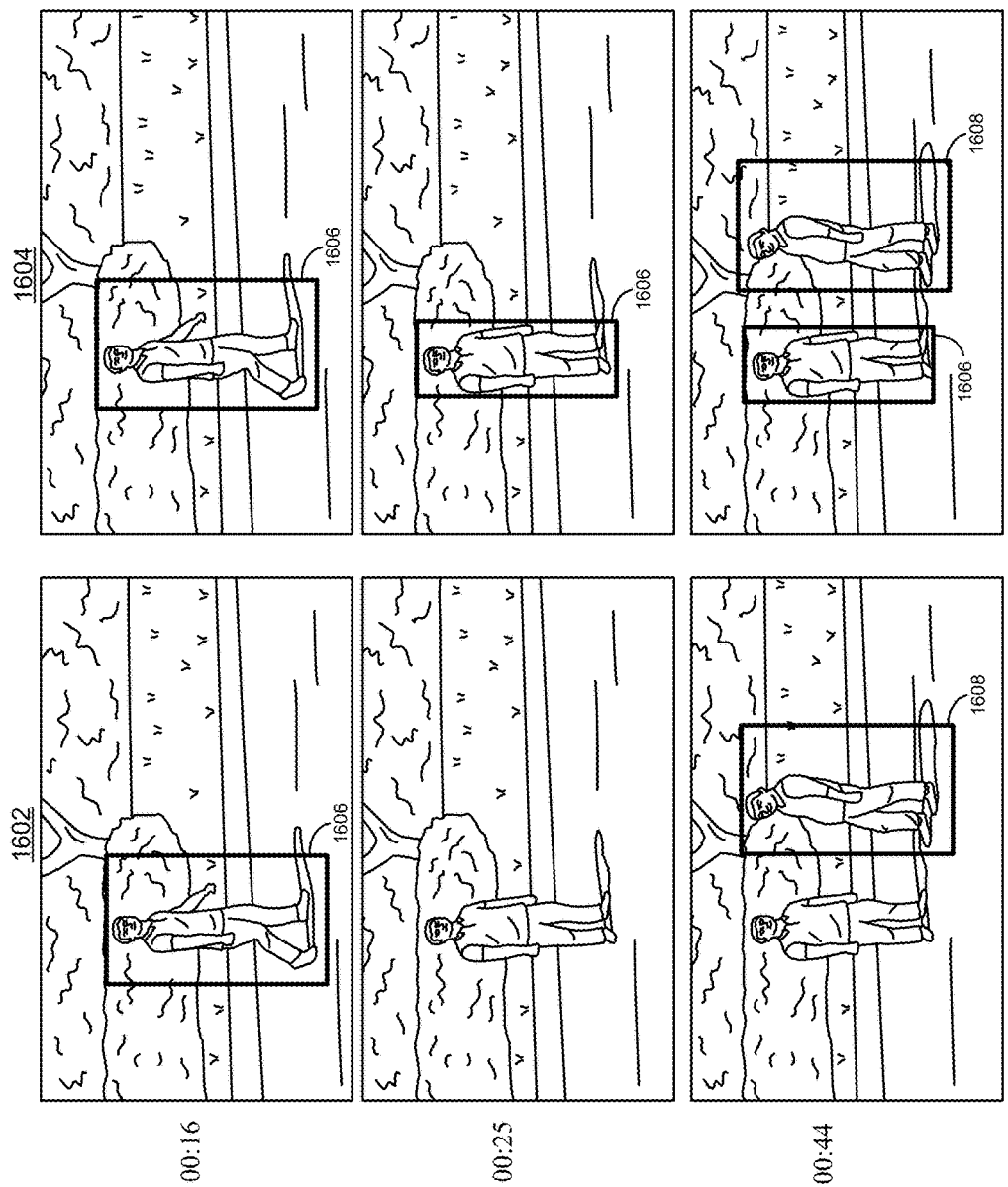
FIG. 16 is an illustration of video frames of an environment in which objects are detected, in accordance with some examples.

FIG. 16 is another illustration of video frames of an environment in which objects are detected. Column 1602 shows object tracking results when sleeping object detection is not performed. At time instance 00:16, a person is detected and tracked by tracker 1606 as the person is moving. At or before the time instance 00:25, the person comes to a stop for an amount of time, which leads to the background subtraction process fading the person into the background. The person continues to remain stopped at time instance 00:44. Because of the background subtraction process fading the car into the background, the person is no longer tracked at time instances 00:25 and 00:44. A person is also tracked by tracker 1608 at time instance 00:44. Column 1604 shows object tracking results when sleeping object detection is enabled and performed. As shown in column 1604, the person is tracked by the tracker 1606 at all three time instances 00:16, 00:25, and 00:44, despite the person being stopped.

Figure 17:
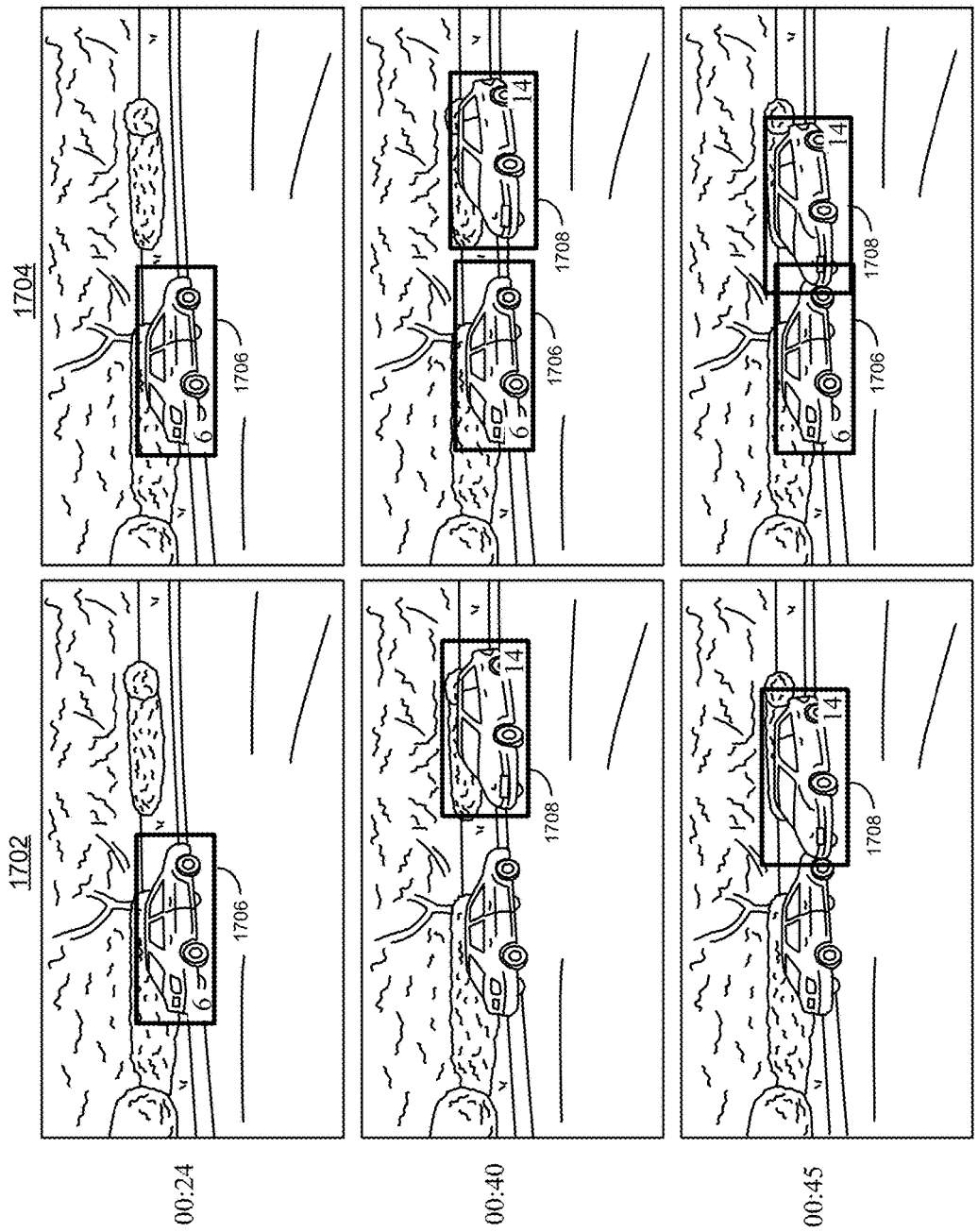
FIG. 17 is an illustration of video frames of an environment in which objects are detected, in accordance with some examples.

FIG. 17 is another illustration of video frames of an environment in which objects are detected. Column 1702 shows object tracking results when sleeping object detection is not performed. At time instance 00:24, a first car is detected and tracked by tracker 1706 as the first car moves through the scene. At or before the time instance 00:40, the first car comes to a stop for a certain period of time, causing the background subtraction process to fade the first car into the background. The first car is no longer tracked at the time instance 00:40 due to being detected as background. Also at time instance 00:40, a second car is detected and tracked by tracker 1708 since the second car is in motion. At time instance 00:45, the first car continues to remain stopped and the second car continues moving, causing the first car to not be tracked and the second car to continue to be tracked by tracker 1708. Column 1704 shows object tracking results when sleeping object detection is enabled and performed. As shown in column 1704, the first car is tracked by the tracker 1706 at all three time instances 00:24, 00:40, and 00:45, despite the car being stopped.

The blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of maintaining blob trackers for video frames, the method comprising:
    identifying, using at least one processor, a blob tracker maintained for a current video frame, wherein the blob tracker is associated with a blob detected in one or more video frames and is configured to track the blob in at least one of the one or more video frames, the blob including pixels of at least a portion of a foreground object in the one or more video frames;
    comparing a current bounding region of the blob tracker for the current video frame to a previous bounding region of the blob tracker for a previous video frame, the previous video frame being obtained earlier in time than the current video frame;
    determining the current bounding region has decreased in size as compared to a size of the previous bounding region;
    determining a portion of the current video frame included in the previous bounding region;
    determining a first color characteristic of pixels included in the portion of the current video frame;
    determining the first color characteristic is within a threshold from a second color characteristic of pixels of the previous video frame, the pixels of the previous video frame corresponding to a portion of the previous video frame included in the previous bounding region; and
    tracking the blob in the current video frame using the current bounding region of the blob tracker when the current bounding region has decreased in size and when the first color characteristic is within the threshold from the second color characteristic.

2. The method of claim 1, further comprising:
    transitioning a status of the blob tracker to a sleeping status when the current bounding region has decreased in size and when the first color characteristic is within the threshold from the second color characteristic; and
    wherein the blob is tracked in the current frame using the current bounding region when the blob tracker has the sleeping status in the current frame.

3. The method of claim 1, further comprising:
    determining the blob tracker is not associated with the blob in the current video frame;
    determining the blob tracker is lost in the current video frame based on the blob tracker not being associated with the blob in the current video frame; and
    determining the current bounding region has decreased in size as compared to the size of the previous bounding region and determining the first color characteristic is within the threshold from the second color characteristic when the blob tracker is determined to be lost in the current video frame.

4. The method of claim 3, further comprising:
    transitioning a status of the blob tracker to a sleeping status when the blob tracker is determined to be lost in the current video frame, when the current bounding region has decreased in size, and when the first color characteristic is within the threshold from the second color characteristic; and
    wherein the blob is tracked in the current video frame using the current bounding region when the blob tracker has the sleeping status in the current video frame.

5. The method of claim 1, wherein determining the current bounding region has decreased in size as compared to the size of the previous bounding region includes:
    determining the current bounding region is within the previous bounding region; and
    determining, when the current bounding region is within the previous bounding region, the current bounding region has decreased in size by a threshold amount as compared to the size of the previous bounding region.

6. The method of claim 5, wherein determining whether the current bounding region is within the previous bounding region includes:
    determining a size of the current bounding region is smaller than the size of the previous bounding region and that boundaries of the current bounding region are entirely within boundaries of the previous bounding region.

7. The method of claim 1, further comprising:
determining bounding regions for the blob tracker have decreased in size as compared to the size of the previous bounding region for a threshold number of frames; and
wherein the blob is tracked in the current video frame using the current bounding region when bounding regions for the blob tracker have decreased in size as compared to the size of the previous bounding region for the threshold number of frames.

8. The method of claim 1, wherein the first color characteristic includes at least one or more of a color feature space or a color mass center of the pixels of the current video frame included in the previous bounding region, and wherein the second color characteristic includes at least one or more of a color feature space or a color mass center of the pixels of the previous video frame included in the previous bounding region.

9. The method of claim 1, wherein determining the first color characteristic is within the threshold from the second color characteristic includes:
calculating a first appearance model for the blob tracker, the first appearance model including at least one or more of a color feature space or a color mass center of the pixels of the current video frame included in the previous bounding region;
calculating a second appearance model for the blob tracker, the second appearance model including at least one or more of a color feature space or a color mass center of the pixels of the previous video frame included in the previous bounding region;
comparing the first appearance model to the second appearance model; and
determining a difference between the first appearance model and the second appearance model is within the threshold.

10. The method of claim 1, wherein the first color characteristic is compared to the second color characteristic to determine the first color characteristic is within the threshold from the second color characteristic when it is determined that the current bounding region has decreased in size as compared to the size of the previous bounding region.

11. The method of claim 1, further comprising updating a target bounding region of the blob tracker from the previous bounding region to a subsequent bounding region of a subsequent video frame, the subsequent video frame being obtained later in time than the current video frame.

12. The method of claim 11, further comprising updating an appearance model of the blob tracker using information of the subsequent video frame.

13. The method of claim 12, further comprising:
determining a size of the subsequent bounding region of the blob tracker for the subsequent video frame has not decreased in size as compared to the size of the previous bounding region; and
wherein at least one or more of the target bounding region or the appearance model are updated when the size of the subsequent bounding region of the blob tracker is determined not to have decreased in size as compared to the size of the previous bounding region.

14. The method of claim 12, further comprising:
determining a color characteristic of pixels included in the subsequent bounding region is not within the threshold from the second color characteristic of the pixels included in the previous bounding region; and
wherein at least one or more of the target bounding region or the appearance model are updated when the color characteristic of the pixels included in the subsequent bounding region is determined not to be within the threshold from the second color characteristic.

15. The method of claim 1, further comprising:
determining whether the blob is within a threshold distance to a boundary of the current video frame; and
wherein the blob is tracked in the current video frame using the current bounding region when the blob is not within the threshold distance to the boundary.

16. The method of claim 1, further comprising:
determining whether the blob is at least partially outside of a boundary of the current video frame; and
wherein the blob is tracked in the current video frame using the current bounding region when the blob is not at least partially outside of the boundary.

17. The method of claim 1, further comprising periodically selecting one or more bounding regions of the blob tracker as one or more target bounding regions according to a first period.

18. The method of claim 17, further comprising periodically comparing subsequent bounding regions of the blob tracker to the one or more selected target bounding regions according to a second period.

19. The method of claim 18, wherein the first period is equal to the second period.

20. The method of claim 18, wherein the first period is less than the second period.

21. The method of claim 18, further comprising updating an appearance model of the blob tracker according to the second period.

22. An apparatus for maintaining blob trackers for video frames, comprising:
a memory configured to store video data associated with the video frames; and
a processor configured to:
identify a blob tracker maintained for a current video frame, wherein the blob tracker is associated with a blob detected in one or more video frames and is configured to track the blob in at least one of the one or more video frames, the blob including pixels of at least a portion of a foreground object in the one or more video frames;
compare a current bounding region of the blob tracker for the current video frame to a previous bounding region of the blob tracker for a previous video frame, the previous video frame being obtained earlier in time than the current video frame;
determine the current bounding region has decreased in size as compared to a size of the previous bounding region;
determine a portion of the current video frame included in the previous bounding region;
determine a first color characteristic of pixels included in the portion of the current video frame;
determine the first color characteristic is within a threshold from a second color characteristic of pixels of the previous video frame, the pixels of the previous video frame corresponding to a portion of the previous video frame included in the previous bounding region; and
track the blob in the current video frame using the current bounding region of the blob tracker when the current bounding region has decreased in size and when the first color characteristic is within the threshold from the second color characteristic.

23. The apparatus of claim 22, wherein the processor is further configured to:
transition a status of the blob tracker to a sleeping status when the current bounding region has decreased in size and when the first color characteristic is within the threshold from the second color characteristic; and
wherein the blob is tracked in the current video frame using the current bounding region when the blob tracker has the sleeping status in the current video frame.

24. The apparatus of claim 22, wherein the processor is further configured to:
determine the blob tracker is not associated with the blob in the current video frame;
determine the blob tracker is lost in the current video frame based on the blob tracker not being associated with the blob in the current video frame; and
determine the current bounding region has decreased in size as compared to the size of the previous bounding region and determining the first color characteristic is within the threshold from the second color characteristic when the blob tracker is determined to be lost in the current video frame.

25. The apparatus of claim 24, wherein the processor is further configured to:
transition a status of the blob tracker to a sleeping status when the blob tracker is determined to be lost in the current video frame, when the current bounding region has decreased in size, and when the first color characteristic is within the threshold from the second color characteristic; and
wherein the blob is tracked in the current video frame using the current bounding region when the blob tracker has the sleeping status in the current video frame.

26. The apparatus of claim 22, wherein determining the current bounding region has decreased in size as compared to the size of the previous bounding region includes:
determining the current bounding region is within the previous bounding region; and
determining, when the current bounding region is within the previous bounding region, the current bounding region has decreased in size by a threshold amount as compared to the size of the previous bounding region.

27. The apparatus of claim 22, wherein the first color characteristic includes at least one or more of a color feature space or a color mass center of the pixels of the current video frame included in the previous bounding region, and wherein the second color characteristic includes at least one or more of a color feature space or a color mass center of the pixels of the previous video frame included in the previous bounding region.

28. The apparatus of claim 22, wherein the processor is further configured to update a target bounding region of the blob tracker from the previous bounding region to a subsequent bounding region of a subsequent video frame, the subsequent video frame being obtained later in time than the current video frame.

29. The apparatus of claim 28, wherein the processor is further configured to update an appearance model of the blob tracker using information of the subsequent video frame.

30. A non-transitory computer-readable medium having stored thereon instructions that, when executed by one or more processors, cause the one or more processor to:
identify a blob tracker maintained for a current video frame, wherein the blob tracker is associated with a blob detected in one or more video frames and is configured to track the blob in at least one of the one or more video frames, the blob including pixels of at least a portion of a foreground object in the one or more video frames;
compare a current bounding region of the blob tracker for the current video frame to a previous bounding region of the blob tracker for a previous video frame, the previous video frame being obtained earlier in time than the current video frame;
determine the current bounding region has decreased in size as compared to a size of the previous bounding region;
determine a portion of the current video frame included in the previous bounding region;
determine a first color characteristic of pixels included in the portion of the current video frame;
determine the first color characteristic is within a threshold from a second color characteristic of pixels of the previous video frame, the pixels of the previous video frame corresponding to a portion of the previous video frame included in the previous bounding region; and
track the blob in the current video frame using the current bounding region when the current bounding region has decreased in size and when the first color characteristic is within the threshold from the second color characteristic.

* * * * *